(12) United States Patent
Nishi

(10) Patent No.: US 6,275,533 B1
(45) Date of Patent: Aug. 14, 2001

(54) IMAGE PROCESSING METHOD, IMAGE PROCESSING APPARATUS, AND DATA RECORDING MEDIUM

(75) Inventor: Takahiro Nishi, Neyagawashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/099,750

(22) Filed: Jun. 18, 1998

(30) Foreign Application Priority Data

Jun. 20, 1997 (JP) .................................................. 9-164654

(51) Int. Cl.$^7$ ....................................................... H04B 1/66
(52) U.S. Cl. ....................................................... 375/240.24
(58) Field of Search ........................ 375/240.18, 240.24, 375/240.2, 240.02; 348/403.1, 416.1, 699, 404.1, 409.1, 400.1, 401.1, 402, 420.1, 430.1; 386/95, 111, 112, 125; 382/250

(56) References Cited

U.S. PATENT DOCUMENTS

| 5,227,878 | * | 7/1993 | Puri et al. ............................ 348/416 |
| 5,461,421 |   | 10/1995 | Moon . |
| 5,539,466 | * | 7/1996 | Igarashi et al. ...................... 348/401 |
| 5,666,461 | * | 9/1997 | Igarashi et al. ...................... 348/409 |
| 5,825,419 | * | 10/1998 | Mishima et al. ...................... 348/402 |

FOREIGN PATENT DOCUMENTS

| 0 598 904 | 6/1994 | (EP) . |
| 01205667 | 8/1989 | (JP) . |

OTHER PUBLICATIONS

Puri, Atul, et al., "Adaptive Frame/Field Motion Compensated Video Coding," Signal Processing Image Communication, vol. 5, No. 1/02, Feb. 1, 1993, pp. 39–58.

Puri, A., et al., "Improvements in DCT Based Video Coding," Proceedings of the Spie, vol. 3024, Part 01, Feb. 12, 1997, pp. 676–688.

"Coding of Audio–Visual Objects: Visual," ISO/IEC 14496–2, Committee Draft, Chapter 7, Coding of Moving Pictures and Audio, ISO/IEC JTCI/SC29/WG11 N2022, May 28, 1998, pp. 136–224, XP002087701.

"Coding of Audio–Visual Objects: Visual," ISO/IEC 14496–2, Committee Draft, Chapter 6, Coding of Moving Pictures and Audio, ISO/IEC JTCI/SC29/WG11 N2202, May 28, 1998, pp. 30–135, XP002087702.

\* cited by examiner

*Primary Examiner*—Chris Kelley
*Assistant Examiner*—Gims Philippe
(74) *Attorney, Agent, or Firm*—Burr & Brown

(57) ABSTRACT

Disclosed is an image processing method in which an image signal is divided into plural image signals corresponding to plural blocks into which an image space formed by the image signal is divided, and these image signals corresponding to the respective blocks are coded block by block. This method comprises the steps of transforming an image signal of a target block to be coded into frequency components by frame-by-frame frequency transformation or field-by-field frequency transformation; generating prediction values of frequency components of the target block with reference to frequency components of a block which has already been coded; and coding difference values between the frequency components of the target block and the prediction values thereof. When the predication values are generated, the coded block to be referred to is decided according to the type of frequency transformation performed to the image signal of the target block, i.e., whether the image signal has bene processed by frame-by-frame frequency transformation of field-by-field frequency transformation. Therefore, spatially redundant information in an interlaced image or a specific progressive image can be reduced satisfactorily by intra-frame prediction, resulting in improved coding efficiency.

8 Claims, 20 Drawing Sheets

IMAGE PROCESSING METHOD, IMAGE PROCESSING APPARATUS, AND DATA RECORDING MEDIUM

FIELD OF THE INVENTION

The present invention relates to an image processing method, an image processing apparatus, and a data recording medium and, more particularly to an image processing method, an image processing apparatus, and a data recording medium in which adaptive intra-frame prediction is performed to frequency components of an interlaced image signal, thereby improving efficiency in coding of an image signal.

BACKGROUND OF THE INVENTION

Predictive coding which compresses image data of a moving picture using its redundancy, includes intra-frame predictive coding which predicts image data using image data in a target frame to-be-coded (hereinafter referred to as a target frame), and inter-frame predictive coding which predicts image data using image data in a frame other than the target frame.

More specifically, in the intra-frame predictive coding, a prediction value of image data in a target frame is generated from the image data in the target frame, and a difference value between a value of the image data and the prediction value is coded, thereby eliminating or reducing a large amount of spatially redundant information inherent in image data, when compressing image data.

Meanwhile, in the inter-frame predictive coding, a prediction value of image data in a target frame is generated from data in another frame, and a difference value between a value of the image data and the prediction value is coded, thereby eliminating or reducing a large amount of temporarily redundant information included in image data of an image in small motion, when compressing image data.

Recently, DCT (Discrete Cosine Transform) has been widely used in image coding. According to MPEG (Moving Picture Expert Group) as a typical image coding method, an image space (frame) formed by a digital image signal is divided into plural rectangular regions (blocks) as DCT units, and the DCT is performed to the image signal for each block.

An intra-frame prediction method of DCT coefficients, i.e., image data in a DCT domain (frequency domain) which is adopted by MPEG is described in "Intra DC and AC prediction for I-VOP and P-VOP" of ISO/IEC JTC1/SC29/WG11 MPEG97/N1642 MPEG-4 Video Verification Model Version 7.0 (hereinafter referred to as MPEG-4 VM 7.0).

According to this reference, a DC (direct current) component and AC (alternating current) components of DCT coefficients of a target block to-be-coded (hereinafter referred to as a target block) are predicted using DCT coefficients of three blocks positioned upper left, above, and left, with respect to and adjacently to the target block in an image space.

FIG. 15 is a diagram for explaining an intra-frame DCT coefficient prediction method described in the reference which is adopted by a prior art image coding method.

Referring now to FIG. 15, there are shown 4 blocks (DCT blocks) R0–R2, and X as DCT units, each comprising 8×8 pixels. These blocks are positioned adjacently to each other in an image space (spatial domain) formed by an image signal. Assume that the block X is a target block, and the blocks R0, R1, and R2 are blocks which have been coded (hereinafter referred to as a coded block), which are positioned upper left, above, and left, with respect to and adjacently to the target block in the spatial domain.

In the prior art intra-frame DCT coefficient prediction method, prediction values of DCT coefficients of the block X are generated with reference to DCT coefficients of the block R1 or the block R2.

Specifically, where DCT coefficients of the coded block R1 are referred to, a DC component in the upper left corner and AC components in the highest row of the coded block R1 are used as prediction values of DCT coefficients positioned at the corresponding positions of the block X. Where DCT coefficients of the coded block R2 are referred to, a DC component in the upper left corner and AC components in the leftmost column of the coded block R2 are used as prediction values of DCT coefficients positioned at the corresponding positions of the block X.

Decision on whether to refer to the coded block R1 or R2, is made using DC components of the coded blocks R0, R1, and R2.

Where an absolute value of difference of DC components between the blocks R0 and R2 is smaller than an absolute value of difference of DC components between the blocks R0 and R1, there is high correlation of DCT coefficients between blocks arranged in the vertical direction, and therefore the DCT coefficients of the block R1 are referred to. On the other hand, where the absolute value of difference of the DC components between the blocks R0 and R1 is smaller than the absolute value of difference of the DC components between the blocks R0 and R2, there is high correlation of DCT coefficients between blocks arranged in the horizontal direction, and therefore the DCT coefficients of the block R2 are referred to.

As described in "Adaptive Frame/Field DCT" of the reference (MPEG-4 VM7.0), DCT (frequency transformation) for use by coding process of an interlaced image, comprises two types of DCT, namely, frame DCT and field DCT. In the frame DCT, image data is transformed frame by frame, while in the field DCT, image data is transformed field by field. According to MPEG, switching between the frame DCT and the field DCT is adaptively performed for each macroblock comprising 4 blocks.

This switching is performed depending on whether or not scanning lines have been rearranged as shown in FIG. 16. In the field DCT, DCT is performed to image data of each of 4 blocks of a macroblock in which scanning lines have been rearranged.

More specifically, in the frame DCT, DCT is performed to image data of each of 4 blocks of macroblock in which even-numbered scanning lines and odd-numbered scanning lines are alternately arranged. In the field DCT, scanning lines are rearranged, and thereby a macroblock comprises a first field block comprising even-numbered scanning lines, and a second field block comprising odd-numbered scanning lines, followed by performing DCT to image data of each block of the macroblock.

Thus, in coding process of an interlaced image signal, macroblocks to which the frame DCT is performed and macroblocks to which the field DCT is performed coexist in an image space.

In a case where correlation of pixel values between the first and second fields is higher than those in the first and second fields, the frame DCT is performed, and in other cases, the field DCT is performed.

Accordingly, in some cases, DCT of neighboring macroblocks or adjacent blocks (subblocks of a macroblock)

differ from each other. In such cases, with respect to DCT coefficients, there is correlation between adjacent macroblocks or blocks lower than in the case of using one type DCT.

In other cases, fields to which adjacent blocks belong, differ from each other between these blocks. Also in such cases, with respect to DCT coefficients, there is correlation between adjacent blocks lower than in a case where the blocks belong to the same field.

However, since in macroblocks which have been processed by the field DCT (field DCT type macroblocks), first field blocks and second field blocks coexist, it is difficult to specify a coded block to be referred to when generating prediction values of DCT coefficients of a target block. For this reason, the prior art intra-frame prediction is not applied to the field DCT type macroblocks. It is therefore impossible to apply the intra-frame prediction to coding of the interlaced image or a specific progressive image in which the field DCT type macroblocks coexist. As a consequence, coding with high efficiency while reducing spatially redundant information satisfactorily is not realized.

SUMMARY OF THE INVENTION

It is an object of the present invention to provide an image processing apparatus, and an image processing method wherein an interlaced image or a specific progressive image in which macroblocks of different DCT types coexist are coded efficiently while satisfactorily reducing spatially redundant image information included in an image signal, and decoding suited to the coding is carried out, and a recording medium in which a program for implementing the coding or decoding executed by a computer is stored.

Other objects and advantages of the invention will become apparent from the detailed description that follows. The detailed description and specific embodiments described are provided only for illustration since various additions and modifications within the spirit and scope of the invention will be apparent to those skilled in the art from the detailed description.

According to a first aspect of the present invention, there is provided an image processing method in which an image signal is divided into plural image signals corresponding to plural blocks into which an image space formed by the image signal is divided, and these image signals corresponding to the respective blocks are successively coded block by block, and the method comprising the steps of: transforming an image signal of a target block to be coded into frequency components by frame-by-frame frequency transformation or field-by-field frequency transformation; generating prediction values of frequency components of the target block with reference to frequency components of a block which has already been coded; and coding difference values between the frequency components of the target block and the prediction values thereof; wherein, when the prediction values are generated, the coded block to be referred to is decided according to whether the image signal of the target block has been processed by frame-by-frame frequency transformation or field-by-field frequency transformation. Therefore, even in coding of an interlaced image signal or a specific progressive image signal in which macroblocks of different DCT types coexist, when prediction values of DCT coefficients of a target block to be coded are generated, DCT coefficients of an already coded block having high correlation with DCT coefficients of the target block are referred to. As a result, spatially redundant information in the interlaced image or the specific progressive image can be reduced efficiently by intra-frame prediction, whereby the coding efficiency is improved.

According to a second aspect of the present invention, there is provided an image processing method for decoding, block by block, coded image signals obtained by coding an image signal for each signal is divided, in a coding process including frequency transformation, and the method comprises the steps of: generating prediction values of frequency components of a target block to be decoded with reference to frequency components of a block which has already been decoded; generating frequency components of the target block by adding the prediction values to a signal obtained by data analysis of a coded image signal corresponding to the target block; and reproducing an image signal corresponding to the target block by subjecting the frequency components of the target block to inverse frequency transformation; wherein, when the prediction values are generated, the decoded block to be referred to is decided according to whether the frequency transformation performed to the target block when it was coded is frame-by-frame frequency transformation or field-by-field frequency transformation. Therefore, it is possible to correctly decode a coded image signal which is obtained by intra-frame prediction coding in which prediction values of DCT coefficients of a target block to be decoded are generated with reference to DCT coefficients of an already coded block having high correlation with DCT coefficients of the target block.

According to a third aspect of the present invention, there is provided an image processing method in which an image signal is divided into plural image signals corresponding to plural blocks into which an image space formed by the image signal is divided, and these image signals corresponding to the respective blocks are successively coded block by block, and the method comprises the steps of: transforming an image signal of a target block to be coded into frequency components by one of two types of frequency transformation, between frame-by-frame frequency transformation and field-by-field frequency transformation; generating prediction values of frequency components of the target block with reference to frequency components of a block which has already been coded; and coding difference values between the frequency components of the target block and the prediction values thereof; wherein, when the prediction values are generated, the coded block to be referred to is decided according to the result of combination between the type of the frequency transformation performed to the target block and the type of the frequency transformation performed to the coded block. Therefore, even in coding of an interlaced image signal or a specific progressive image signal in which macroblocks of different DCT types coexist, when prediction values of DCT coefficients of a target block to be coded are generated, DCT coefficients of an already coded block having high correlation with DCT coefficients of the target block are referred to. As a result, spatially redundant information in the interlaced image or the specific progressive image can be reduced more efficiently by intra-frame prediction, whereby the coding efficiency is further improved.

According to a fourth aspect of the present invention, in an image processing method as defined in the third aspect, when the type of the frequency transformation performed to one of a coded block positioned at the left of the target block and a coded block positioned above the target block in the image space is the same as the type of the frequency transformation performed to the target block, prediction values of frequency components of the target block are generated with reference to frequency components of the coded block of the same frequency transformation type as the target block. Therefore, when prediction values of DCT coefficients of the target block are generated, DCT coefficients of a coded block having high correlation with DCT coefficients of the target block can be referred to with reliability.

According to a fifth aspect of the present invention, in an image processing method as defined in the third aspect, when the type of the frequency transformation performed to both of a coded block positioned at the left of the target block and a coded block positioned above the target block in the image space is different from the type of the frequency transformation performed to the target block, prediction values of frequency components of the target block, prediction values of frequency components of the target block are generated with reference to frequency components of the coded block positioned above the target block. Since, in a moving picture, change in the horizontal direction is usually larger than change in the vertical direction, DCT coefficients of an already coded block having high correlation with DCT coefficients of the target block are referred to frequently.

According to a sixth aspect of the present invention, there is provided an image processing method for decoding, block by block, coded image signals obtained by coding an image signal for each of plural blocks, into which an image space formed by the image signal is divided, in a coding process including one of frame-by-frame frequency transformation and field-by-field frequency transformation, and the method comprises the steps of: generating prediction values of frequency components of a target block to be decoded with reference to frequency components of a block which has already been decoded; generating frequency components of the target block by adding the prediction values to a signal obtained by data analysis of a coded image signal corresponding to the target block; and reproducing an image signal corresponding to the target block by subjecting the frequency components of the target block to inverse frequency transformation; wherein, when the prediction values are generated, the decoded block to be referred to is decided according to the result of combination between the type of the frequency transformation performed to the target block when it was coded and the type of the frequency transformation performed to the coded block when it was coded. Therefore, it is possible to correctly decode a coded image signal which is obtained by intra-frame prediction coding in which prediction values of DCT coefficients of a target block to be decoded are generated with reference to DCT coefficients of an already coded block having higher correlation with DCT coefficients of the target block.

According to a seventh aspect of the present invention, in an image processing method as defined in the sixth aspect, when the type of the frequency transformation performed to one of a decoded block positioned at the left of the target block and a decoded block positioned above the target block on the image space when they were coded is the same as the type of the frequency transformation performed to the target block when it was coded, prediction values of frequency components of the target block are generated with reference to frequency components of the decoded block of the same frequency transformation type as the target block. Therefore, it is possible to correctly decode a coded image signal which is obtained by intra-frame prediction coding in which, when prediction values of DCT coefficients of a target block to be coded are generated, DCT coefficients of a coded block having high correlation with DCT coefficients of the target block are referred to with reliability.

According to an eighth aspect of the present invention, in an image processing method as defined in the sixth aspect, when the type of the frequency transformation performed to both of a decoded block positioned at the left of the target block and a decoded block positioned above the target block in the image space when they were coded is different from the type of the frequency transformation performed to the target block when it was coded, prediction values of frequency components of the target block are generated with reference to frequency components of the decoded block positioned above the target block. Therefore, it is possible to correctly decode a coded image signal which is obtained by intra-frame predictive coding in which DCT coefficients of an already coded block having high correlation with DCT coefficients of the target block are referred to frequently.

According to a ninth aspect of the present invention, there is provided an image processing method in which an image signal is divided into plural image signals corresponding to plural blocks into which an image space formed by the image signal is divided, and these image signals corresponding to the respective blocks are successively coded block by block, and the method comprises the steps of: transforming an image signal of a target block to be coded into frequency components by one of two types of frequency transformation, between frame-by-frame frequency transformation and field-by-field frequency transformation; generating prediction values of frequency components of the target block with reference to frequency components of a block which has already been coded; and coding difference values between the frequency components of the target block and the prediction values thereof; wherein, when the prediction values are generated, if the type of the frequency transformation performed to the target block is different from the type of the frequency transformation performed to the coded block, frequency components to be referred to are generated from frequency components of plural coded blocks. Therefore, even when the type of frequency transformation of the reference block is different from that of the target block, frequency components having frequency characteristics similar to those of frequency components of a reference block, of which frequency transformation type is the same as that of the target block, are referred to, whereby the correlation between the reference frequency components and the frequency components of the target block is increased. As a result, spatially redundant information in the interlaced image or the specific progressive image can be reduced efficiently by intra-frame prediction, whereby the coding efficiency is improved.

According to a tenth aspect of the present invention, there is provided an image processing method for decoding, block by block, coded image signals obtained by coding an image signal for each of plural blocks, into which an image space formed by the image signal is divided, in a coding process including one of frame-by-frame frequency transformation and field-by-field frequency transformation, and the method comprises the steps of: generating prediction values of frequency components of a target block to be decoded with reference to frequency components of a block which has already been decoded; generating frequency components of the target block by adding the prediction values to a signal obtained by data analysis of a coded image signal corresponding to the target block; and reproducing an image signal corresponding to the target block by subjecting the frequency components of the target block to inverse frequency transformation; wherein, when the prediction values are generated, if the type of the frequency transformation performed to the target block is different from the type of the frequency transformation performed to the decoded block, frequency components to be referred to are generated from frequency components of plural decoded blocks. Therefore, it is possible to decode a coded image signal obtained by intra-frame prediction coding in which frequency components having high correlation with frequency components of a target block to be coded are referred to, even when the type of frequency transformation of the reference block is different from that of the target block.

According to an eleventh aspect of the present invention, there if provided an image processing apparatus for dividing an image signal into plural image signals corresponding to plural blocks into which an image space formed by the image signal is divided, and coding these image signals corresponding to the respective blocks successively block by block, and this apparatus comprises: a blocking unit for performing blocking to divide the image signal into plural image signals corresponding to the respective blocks in the image space, the blocking being performed for each frame or field that is a processing unit of frequency transformation, and outputting the image signals of the respective blocks and frequency transformation type information showing the processing unit of frequency transformation; a frequency transformer for subjecting the image signals of the respective blocks to block-by-block frequency transformation, and outputting frequency components corresponding to the image signal of each block; a quantizer for quantizing the frequency components and outputting quantized values corresponding to each block; storage means for storing quantized values of plural blocks which have already been coded; a predictor for selecting a coded block from the coded blocks stored in the storage means according to the frequency transformation type information, and generating prediction values of quantized values of a target block to be coded, with reference to the quantized values of the coded block selected; a first adder for subtracting the prediction values of the target block from the quantized values of the target block, and outputting the difference values; a variable-length coder for subjecting the difference values to variable-length coding, and outputting a coded stream; and a second adder for adding the prediction values of the target block to the difference values of the target block, and supplying the sums to the storage means as quantized values of coded blocks. Therefore, even in coding of an interlaced image signal or a specific progressive image signal in which macroblocks of different DCT types coexist, when prediction values of quantized values of a target block to be coded are generated, quantized values of an already coded block having high correlation with quantized values of the target block are referred to. As a result, spatially redundant information in the interlaced image or the specific progressive image can be reduced efficiently by intra-frame prediction, whereby the coding efficiency is improved.

According to a twelfth aspect of the present invention, there is provided an image processing apparatus for receiving coded image signals obtained by coding an image signal for each of plural blocks, into which an image space formed by the image signal is divided, in a coding process including frame-by-frame frequency transformation or field-by-field frequency transformation and quantization, and receiving frequency transformation type information showing whether each block has been subjected to frame-by-frame frequency transformation or field-by-field frequency transformation, and successively decoding the coded image signals block by block, and the apparatus comprises: a variable-length decoder for subjecting the coded image signal corresponding to each block to variable-length decoding by data analysis; a predictor for selecting a decoded block from plural blocks which have already been decoded according to the frequency transformation type information, and generating prediction values of quantized values of a target block to be decoded with reference to quantized values of the decoded block selected; an adder for adding the output from the variable-length coder corresponding to the target block and the prediction values of quantized values of the target block, and outputting the sums as quantized values of the target block; storage means for storing the quantized values output from the adder as quantized values of decoded blocks; an inverse quantizer for subjecting the quantized values of the target block to inverse quantization, and outputting frequency components of the target block; an inverse frequency transformer for subjecting the frequency components of the target block to inverse frequency transformation, and reproducing an image signal corresponding to the target block; and an inverse blocking unit for converting image signals of scanning-line structure, according to the frequency transformation type information. Therefore, it is possible to correctly decode a coded image signal which is obtained by intra-frame prediction coding in which prediction values of quantized values of a target block to be decoded are generated with reference to quantized values of an already coded block having high correlation with quantized values of the target block.

According to a thirteenth aspect of the present invention, an image processing method in which an image signal forming an image space comprising plural pixels arranged in matrix in horizontal and vertical directions is divided into image signals corresponding to plural macroblocks of a rectangular shape into which the image space is divided, and image signals of subblocks of each macroblock are coded for each subblock, comprises: rearranging horizontal pixel rows of an image signal of a macroblock so that a first field image formed by image signal son odd-numbered horizontal pixel rows is positioned at an upper side of the macroblock and a second field image formed by image signals on even-numbered horizontal pixel rows is positioned at a lower side of the macroblock; transforming one of the image signal of the macroblock in which rearrangement has been performed and an image signal of a macroblock in which rearrangement has not been performed, into frequency components by frequency transformation, for each of four subblocks positioned upper left, upper right, lower left, and lower right in the macroblock; generating prediction values of frequency components of a target subblock to be coded by referring to at least one of subblocks which have been already coded and are positioned in the vicinity of and above the target block, in the vicinity of and at the left of the target block, and in the vicinity of and at the upper left of the target block, respectively, in the image space; and coding difference values between the frequency components and the prediction values of the target subblock. Therefore, in a macroblock which has been processed by field DCT, positions of blocks in the first and second fields are defined, and a coded block to-be- referred to can be specified when generating prediction values of DCT coefficients of the target block. Thereby, it is possible to apply the prior art intra-frame prediction to a macroblock of the field DCT type, and therefore in coding process of an interlaced image or a specific progressive image in which macroblocks of the field DCT type coexists, coding can be carried out efficiently by the use of the intra-frame prediction while satisfactorily reducing spatially redundant image information included in an image signal.

According to a fourteenth aspect of the present invention, in the image processing method as defined in the thirteenth aspect, when the prediction values of the frequency components of the target subblock are generated, it is decided that one of the coded subblock positioned in the vicinity of and above the target subblock and the coded subblock positioned in the vicinity of and at the left of the target subblock is referred to, based on direct current components of frequency components of the coded subblocks which are positioned in the vicinity of and above the target subblock, in the vicinity of and at the left of the target subblock, and in the vicinity of and at the upper left of the target subblock, respectively. Therefore, it is possible to specify a coded block with higher correlation of DCT coefficients with respect to a target block.

According to a fifteenth aspect of the present invention, in the image processing method as defined in the fourteenth aspect, as the coded subblock positioned in the vicinity of and above the target subblock, a coded subblock positioned above and adjacently to the target subblock, as the coded subblock positioned in the vicinity of and at the left of the target subblock, a coded subblock positioned at the left of and adjacently to the target subblock, as the coded subblock positioned in the vicinity of and at the upper left of the target subblock, a coded subblock positioned at the upper left of and adjacently to the target subblock, when an absolute value of difference of direct current components of frequency components between the coded subblock positioned above and the coded subblock positioned at the upper left is smaller than an absolute value of difference of direct current components of frequency components between the coded subblock positioned at the left and the coded subblock positioned at the upper left, the prediction values of the frequency components of the target subblock are generated by referring to frequency components of the coded subblock positioned at the left, and when an absolute value of difference of direct current components of frequency components between the coded subblock positioned at the left and the coded subblock positioned at the left, and when an absolute value of difference of direct current components of frequency components between the coded subblock positioned at the left and the coded subblock positioned at the upper left is smaller than an absolute value of difference of direct current components of frequency components between the coded subblock positioned above and the coded subblock positioned at the upper left, the prediction values of the frequency components of the target subblock are generated by referring to frequency components of the coded subblock positioned above. Therefore, frequency components of a coded subblock which is spatially close to a target subblock is referred to when generating prediction values of frequency components of the target block, resulting in improved efficiency in prediction.

According to a sixteenth aspect of the present invention, in an image processing method as defined in the thirteenth aspect, employed as prediction values of frequency components of the target subblock is one of a first weighted average of frequency component obtained among a first group of plural coded subblocks which are positioned above the target subblock and aligned in the vertical direction, and a second weighted average of frequency component obtained among a second group of plural coded subblocks which are positioned at the left of the target subblock and aligned in the vertical direction. Therefore, even when the type of frequency transformation of the coded subblock positioned adjacent to the target subblock is different from that of the target subblock, the prediction efficiency is not degraded considerably in comparison with the case where the type of frequency transformation of the target subblock is identical to that of the coded subblock adjacent thereto.

According to a seventeenth aspect of the present invention, in an image processing method as defined in the sixteenth aspect, the first weighted average is obtained by performing the weighted averaging of frequency component with a weighting ratio of 1 for a specific coded subblock among the first-group coded subblocks; and the second weighted average is obtained by performing the weighted averaging of frequency component with a weighting ratio of 1 for a specific coded subblock among the second-group coded subblocks. Therefore, the first and second weighted average can be obtained by simple operation.

According to an eighteenth aspect of the present invention, in an image processing method as defined in the seventeenth aspect, the specific coded block among the first-group coded subblocks is one positioned nearest to the target block among the first-group coded subblocks; and the specific coded block among the second-group coded subblocks is one positioned nearest to the target block among the second-group coded subblocks. Therefore, prediction values of frequency components of the target subblock are generated with reference to frequency components of coded subblocks which are spatially nearest to the target subblock, resulting in improved coding efficiency.

According to a nineteenth aspect of the present invention, an image processing method for decoding a coded image signal for each subblock in which coding including rearrangement of horizontal pixel rows and frequency transformation has been performed to an image signal forming an image space comprising plural pixels arranged in matrix in the horizontal and vertical directions for each of subblocks of respective macroblocks of a rectangular shape into which the image space is divided, comprises generating prediction values of frequency components of a target subblok to be decoded by referring to at least one of subblocks which have been already decoded and are positioned in the vicinity of and above the target subblock, in the vicinity of and at the left of the target subblock, respectively in the image space; adding signals obtained by data analysis of the coded image signal of the target subblock to the prediction values to generate frequency components of the target subblock; transforming the generated frequency components of the subblock into an image signal by inverse frequency transformation; combining image signals of subblocks which belong to the same macroblock in the image space correspondingly to subblock positions in the macroblock, to generate an image signal of the macroblock; with respect to an image signal of a macroblock in which horizontal pixel rows have been rearranged when it has been coded so that the first field image formed by image signals on odd-numbered horizontal pixel rows is positioned at an upper side of the macroblock, and a second field image formed by image signals on even-numbers horizontal pixel rows is positioned at a lower side of the macroblock, performing rearrangement for restoration to the horizontal pixel rows so as to form a frame image comprising the first and second fields, and with respect to an image signal of a macroblock in which the horizontal pixel rows have not been rearranged, regenerating an image signal forming an image space comprising plural macroblocks without performing rearrangement for restoration to the horizontal pixel rows. Therefore, positions of subblocks in the first and second fields are defined in the macroblock, and thereby a coded image signal obtained by the intra-frame prediction can be correctly decoded.

According to a twentieth aspect of the present invention, in image processing method as defined in the nineteenth aspect, when the prediction values of the frequency components of the target subblock are generated, it is decided that one of the decoded subblock positioned in the vicinity of and above the target subblock and the decoded subblock positioned in the vicinity of and at the left of the target subblock is referred to, based on direct current components of frequency components of the decoded subblocks which are positioned in the vicinity of and above the target subblock, in the vicinity of and at the left of the target subblock, and in the vicinity of and at the upper left of the target subblock, respectively. Therefore, it is possible to specify a decoded block with higher correlation of DCT coefficient with respect to a target block.

According to a twenty-first aspect of the present invention, in the image processing method as defined of the twentieth aspect, as the decoded subblock positioned in the vicinity of and above the target subblock, a decoded subblock positioned above and adjacently to the target subblock, as the decoded subblock positioned in the vicinity of and at the left of the target subblock, a decoded subblock positioned at the left of and adjacently to the target subblock, as the decoded subblock positioned in the vicinity of and at the upper left of the target subblock, a decoded block positioned at the upper left of and adjacently to the target subblock, when an absolute value of difference of direct current components of frequency components between the decoded subblock positioned above and the decoded subblock positioned at the upper left is smaller than an absolute value of difference of direct current components of frequency components between the decoded subblock positioned at the left and the decoded subblock positioned at the upper left, the prediction values of the frequency components of the target subblock are generated by referring to frequency components of the decoded subblock positioned at the left, and when an absolute value of difference of direct current components of frequency components between the decoded subblock positioned at the let and the decoded subblock positioned at the upper left is smaller than an absolute value of difference of direct current components of frequency components between the decoded subblock positioned above and the decoded subblock positioned at the upper left, the prediction values of the frequency components of the target subblock are generated by referring to frequency components of the decoded subblock positioned above. Therefore, frequency components of a decoded subblock which is spatially close to a target subblock is referred to when generating prediction values of frequency components of the target block, whereby intra-frame predictive decoding suited to intra-frame predictive coding with higher efficiency is realized.

According to a twenty-second aspect of the present invention, in an image processing method as defined in the nineteenth aspect, employed as prediction values of frequency components of the target subblock is one of a first weighted average of frequency component obtained among a first group of plural decoded subblocks which are positioned above the target subblock and aligned in the vertical direction, and a second weighted average of frequency component obtained among a second group of plural decoded subblocks which are positioned at the left of the target subblock and aligned in the vertical direction. Therefore, even when the type of frequency transformation of a decoded subblock positioned adjacent to the target subblock is different from that of the target subblock, the prediction efficiency is not degraded considerably in comparison with the case where the type of frequency transformation of the target subblock is identical to that of the decoded subblock adjacent thereto, resulting in intra-frame prediction decoding corresponding to intra-frame prediction coding of high prediction efficiency.

According to a twenty-third aspect of the present invention, in an image processing method as defined in the twenty-second aspect, the first weighted average is obtained by performing the weighted averaging of frequency component with a weighting ratio of 1 for a specific decoded subblock among the first-group decoded subblocks; and the second weighted average is obtained by performing the weighted averaging of frequency component with a weighting ratio of 1 for a specific decoded subblock among the second-group decoded subblocks. Therefore, the first and second weighted averages can be obtained by simple operation.

According to a twenty-fourth aspect of the present invention, in an image processing method as defined in the twenty-third aspect, the specific decoded block among the first-group decoded subblocks is one positioned nearest to the target block among the first-group decoded subblocks; and the specific decoded block among the second-group decoded subblocks is one positioned nearest to the target block among the second-group decoded subblocks. Therefore, prediction values of frequency components of the target subblock are generated with reference to frequency components of decoded subblocks which are spatially nearest to the target subblock, resulting in intra-frame prediction decoding corresponding to intra-frame prediction coding of high prediction efficiency.

According to a twenty-fifth aspect of the present invention, an image processing apparatus in which an image signal forming an image space comprising plural pixels arrange din matrix in horizontal and vertical directions is divided into image signals corresponding to plural macroblocks of a rectangular shape into which the image space is divided, and image signals of subblocks of each macroblock are coded for each subblock, comprises: a blocking unit for dividing the image signal into image signals corresponding to plural macroblocks into which the image space is divided, rearranging horizontal pixel rows of an image signal of a macroblock so that a first field image formed by image signals on odd-numbered horizontal pixel rows is positioned at an upper side of the macroblock and a second field image formed by image signals on even-numbered horizontal pixel rows is positioned at a lower side of the macroblock, and dividing one of the image signal of the macroblock in which rearrangement has been performed and an image signal of a macroblock in which rearrangement has not been performed, into image signals corresponding to four subblocks positioned at the upper left, the upper right, the lower left, and the lower right, respectively in the macroblock; a frequency transformer for performing frequency transformation to image signals of respective blocks for each subblock and outputting frequency components of an image signal of each subblock; a quantizer for quantizing the frequency components and outputting quantization values of each subblock; storage means for storing quantization values of plural subblocks which have already been coded; a predictor for selecting at least one of coded subblocks which are positioned in the vicinity of and above the target subblock, in the vicinity of and at the left of the target block, and in the vicinity of and at the upper left of the target block, respectively in the image space, and generating prediction values of quantization values of the largest subblock by referring to quantization values of the selected coded subblock; a first adder for subtracting prediction values from the quantization values of the coded subblock; and outputting difference values of the target subblock; a variable length encoder for performing variable length coding to the difference values and outputting a coded stream; and a second adder for adding the difference values of the target subblock to prediction values of the target subblock, and supplying the storage means with the resulting addition values as quantization values of the coded subblock. Therefore, in a macroblock which has been processed by field DCT, positions of blocks in the first and second fields are defined, and a coded block to-be referred to can be specified when generating prediction values of DCT coefficients of the target block. Thereby, it is possible to apply the prior art intra-frame prediction to a macroblock of the field DCT type, and therefore in coding process of an interlaced image or a specific progressive image in which macroblocks of the field DCT type coexists, coding can be carried out efficiently by the use of the intra-frame prediction while satisfactorily reducing spatially redundant image information included in the image signal.

According to a twenty-sixth aspect of the present invention, an image processing apparatus for decoding a coded image signal for each subblock in which coding including rearrangement of horizontal pixel rows and frequency transformation has been performed to an image signal forming an image space comprising plural pixels arranged in matrix in the horizontal and vertical directions for each of subblocks of respective macroblocks of a rectangular shape into which the image space is divided, comprises a variable length decoder for performing variable length decoding to the coded image signal of each subblock by data analysis; a predictor for selecting at least one of subblocks which have been already decoded and are positioned in the vicinity of and above the target subblock, in the vicinity of and at the left of the target subblock, and in the vicinity of and at the upper left of the target subblock, respectively in the image space, and generating prediction values of quantization values of the target subblocks by referring to quantization values of the selected decoded subblocks; an adder for adding a signal of the target subblock output from the variable length decoder to prediction values of the quantization values of the target subblock, and outputting the resulting addition values as quantization values of the target block; storage means for storing the quantization values output from the adder as quantization values of the decoded subblock; an inverse quantizer for inversely quantizing the quantization values of the target subblock and outputting frequency components of the target subblock; an inverse frequency transformer for performing inverse frequency transformation to frequency components of the target subblock to regenerate an image signal of the target subblock; and an inverse blocking unit for combining image signals of subblocks which belong to the same macroblock in the image space correspondingly to subblock positions in the macroblock, to generate an image signal of the macroblock, with respect to an image signal of a macroblock in which horizontal pixel rows have been rearranged when it has been coded so that a first field image formed by image signals on odd-numbered horizontal pixel rows is positioned at an upper side of the macroblock, and a second field image formed by image signals on even-numbered horizontal pixel rows is positioned at a lower side of the macroblock, performing rearrangement for restoration to the horizontal pixel rows as to form a frame image comprising the first and second fields, and with respect to an image signal of a macroblock in which the horizontal pixel rose have not been rearranged, regenerating an image signal forming an image space comprising plural macroblocks without performing rearrangement for restoration to the horizontal pixel rows. Therefore, positions of subblocks in the first and second fields are defined in the macroblock, and thereby a coded image signal obtained by the intra-frame prediction can be correctly decoded.

According to a twenty-seventh aspect of the present invention, a data recording medium for storing an image processing program and the program makes a computer perform image processing by image processing methods of aspect 1 to 10, or aspect 13 to 24. Therefore, intra-frame predictive coding or intra-frame predictive decoding with higher efficiency in prediction is implemented in software.

DETAILED DESCRIPTION OF THE PREFERRED EMBODIMENTS

[Embodiment 1]

An image processing apparatus (image coding apparatus) and an image processing method (image coding method) according to a first embodiment of the present invention are characterized by performing intra-frame prediction coding of an image signal by employing an adaptive intra-frame DCT coefficient prediction method, i.e., a method of generating prediction values of DCT coefficients of a block to be coded (a target block) from DCT coefficients of a block which has already been coded, according to a DCT type signal (frequency transformation type signal) of the coded block. The DCT type signal is a signal showing whether the target block has been processed by frame DCT or field DCT.

Figure 1:
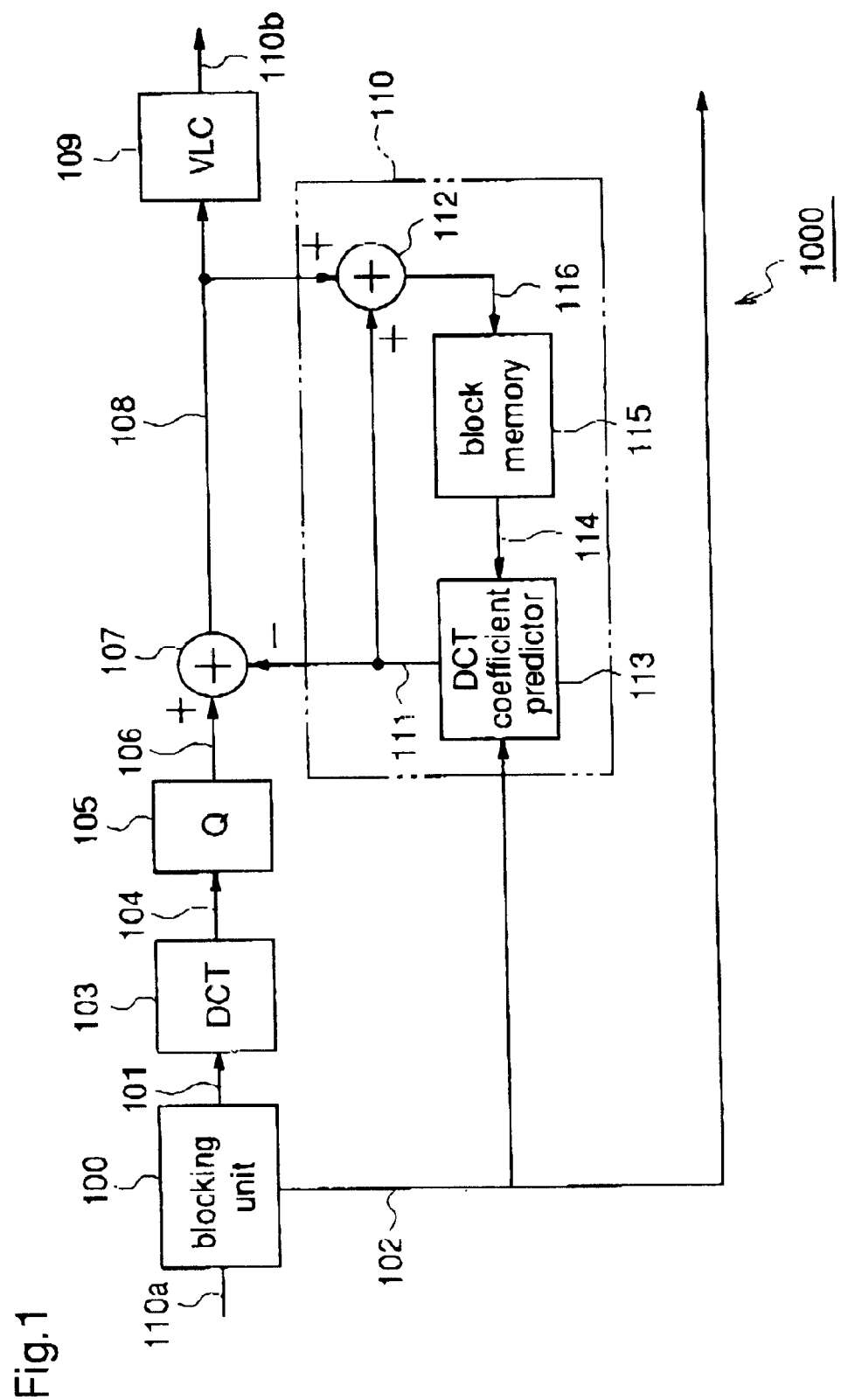
FIG. 1 is a block diagram illustrating an image processing apparatus (image coding apparatus) according to a first embodiment of the invention.

FIG. 1 is a block diagram illustrating an image coding apparatus according to the first embodiment. In FIG. 1, reference numeral 1000 designates an image coding apparatus, wherein an input digital image signal (input image signal) 110a is divided into plural image signals corresponding to plural blocks into which an image space (frame) formed by the digital image signal 110a is divided, and these image signals corresponding to the respective blocks are coded block by block.

The image coding apparatus 1000 includes a blocking unit 100 which divides the input image signal 110a into plural image signals corresponding to the respective blocks mentioned above for each frame or field (a processing unit of frequency transformation), and outputs the image signals 101 of the respective blocks and a DCT type signal 102 showing the processing unit of the frequency transformation (DCT). To be specific, the blocking unit 100 receives the input image signal 100a and, when the correlation of pixel values between fields is higher than the correlation of pixel values within a frame, the blocking unit 100 performs rearrangement of scanning lines for each macroblock comprising 16×16 pixels so that field DCT is executed, and outputs the image signal block by block, which block comprises 8×8 pixels and is a component of the macroblock subjected to the rearrangement of scanning lines.

In the blocking unit 100, when the correlation of pixel values between fields is lower than the correlation of pixel values within a frame, the above-described rearrangement of scanning lines for each macroblock is not carried out, and the input image signal is output block by block as mentioned above.

Further, the image coding apparatus 1000 includes a DCT unit 103 which subjects the blocked image signal 101 to DCT to transform it into frequency components (DCT coefficients) 104; a quantizer 105 which quantizes the DCT coefficients 104 to generate quantized values (quantized DCT coefficients) corresponding to each block; an intra-frame prediction unit 110 which generates prediction values 11 of a target block by intra-frame prediction on the basis of the DCT type signal 102; an adder 107 which subtracts the prediction values 111 from the quantized DCT coefficients 106 and outputs DCT coefficient which subjects the DCT coefficient difference values 108 to variable-length coding and outputs a bit stream (a coded image signal 110b).

The intra-frame prediction unit 110 comprises an adder 112 which adds the DCT coefficient difference values 108 and the intra-frame prediction values 111; a block memory 115 which stores the output from the adder 112 as quantized DCT coefficients 116 of the block which have been coded; and a DCT coefficient predictor 113 which generates prediction values 111 of quantized DCT coefficients of the target block from quantized DCT coefficients 114 of the coded block, according to the DCT type signal 102, by the adaptive intra-frame DCT coefficient prediction method.

Hereinafter, the operation of the image coding apparatus 1000 will be described.

First of all, a description is given of the operation in a coding process using adaptive DCT prediction.

When a digital image signal (input image signal) 110a is input to the image coding apparatus 1000, in the blocking unit 100, the image signal 110a is divided into plural image signals corresponding to the respective blocks described above for each frame or field (a processing unit of frequency transformation), and the blocking unit 100 outputs the blocked image signal 101 and a DCT type signal 102 showing the processing unit of frequency transformation (DCT).

In the blocking unit 100, when the correlation of pixel values between fields is higher than the correlation of pixel values in a frame, the image signal is subjected to rearrangement of scanning lines for each macroblock comprising 16×16 pixels so that field DCT is executed, and the image signal in which the scanning lines have been rearranged is output block by block, which block comprises 8×8 pixels and is a component of the macroblock.

However, when the correlation of pixel values between fields is lower than the correlation of pixel values in a frame, the above-described rearrangement of scanning lines for each macroblock is not carried out, and the input image signal is output block by block as mentioned above.

Then, the image signal 101 corresponding to a target block to be coded is transformed to frequency components (DCT coefficients) 104 of the target block by discrete cosine transform (DCT) in the DCT unit 103, and the DCT coefficients 104 are quantized by the quantizer 105 and outputted as quantized values (quantized DCT coefficients) 106 of the target block.

Further, the quantized DCT coefficients 106 of the target block are input to the adder 107, wherein difference values between the quantized values 106 and the prediction values 111 are obtained, and these difference values are output as DCT coefficient difference values 108. The DCT coefficient difference values 108 are subjected to variable-length coding in the VLC 109 and outputted as a bit stream (coded image signal) 110b.

The DCT coefficient difference values 108 output from the adder 102 are input to the intra-frame prediction unit 110, wherein prediction values of the quantized DCT coefficients 106 are generated.

To be specific, in the intra-frame prediction unit 110, the DCT coefficient difference values 108 and the intra-frame prediction values 111 are added by the adder 112, and the sums are stored in the block memory 115 as quantized DCT coefficients 116 of the coded block. In the DCT coefficient predictor 113, prediction values 111 of the quantized DCT coefficients of the target block are generated from the quantized DCT coefficients 114 of the coded block, according to the DCT type signal 102, by the adaptive intra-frame DCT coefficient prediction method.

Hereinafter, the adaptive intra-frame DCT coefficient prediction method employed in the above-described coding process will be described in more detail.

In the adaptive intra-frame DCT coefficient prediction method according to the first embodiment, when prediction values of DCT coefficients corresponding to a target block are generated, reference blocks used for prediction are selected according to the DCT type of the target block.

In this first embodiment, a DCT domain is defined as follows.

A DCT domain (frequency domain) is a domain comprising frequency components which are obtained by subjecting an image signal forming an image space (spatial domain) to DCT (frequency transformation). In the DCT domain (frequency domain), macroblocks are arranged in the same way as macroblocks are arranged in the spatial domain of the image signal (image space).

Figure 3:
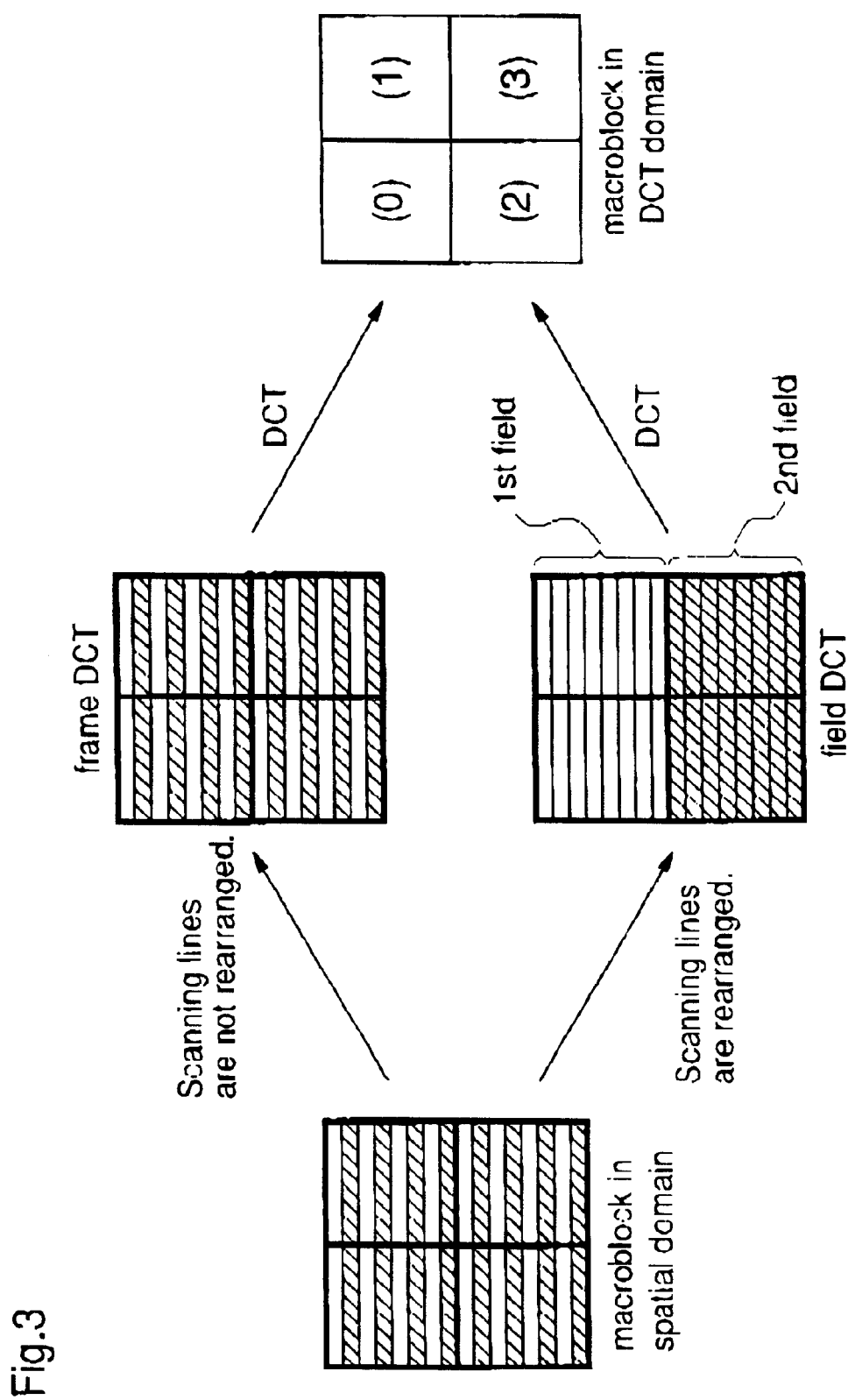
FIG. 3 is a diagram for explaining intra-frame predictive coding by the image coding apparatus according to the first embodiment, and shows arrangement of DCT blocks in a macroblock in a DCT domain.

Further, as shown in FIG. 3, when a macroblock is subjected to frame DCT, the image signal corresponding to each block is subjected to DCT without rearranging scanning lines in the macroblock, and DCT coefficients corresponding to the upper-left, upper-right, lower-left, and lower-right blocks in the macroblock in the spatial domain are respectively arranged in the areas (0), (1), (2), and (3) of the macroblock in the DCT domain. On the other hand, when a macroblock is subjected to field DCT, after rearrangement of scanning lines in the macroblock in the spatial domain, the image signal corresponding to each block is subjected to DCT, and DCT data of the left block in the 1st field, the right block in the 1st field, the left block in the 2nd field, and the right block in the 2nd field are respectively arranged in the areas (0), (1), (2), and (3) of the macroblock in the DCT domain.

Next, a description is given of the adaptive intra-frame DCT coefficient prediction method in which DCT coefficients corresponding to a target block (data of a target block in the DCT domain) are predicted with reference to DCT coefficients of a coded block and, during the prediction, the coded block to be referred to is selected according to the DCT type of the target block.

Figure 4:
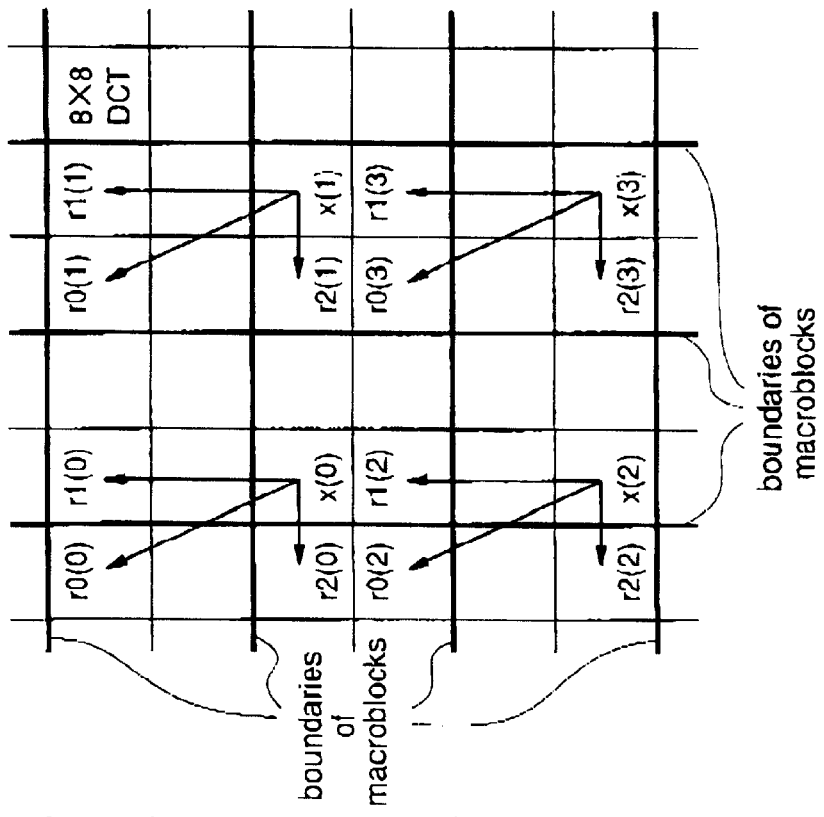
FIGS. 4(*a*) and 4(*b*) are diagrams for explaining intra-frame predictive coding by the image coding apparatus according to the first embodiment, and show the positions of reference blocks relative to blocks to be coded, in frame prediction (FIG. 4(*a*)) and field prediction (FIG. 4(*b*)).
Figure 4:
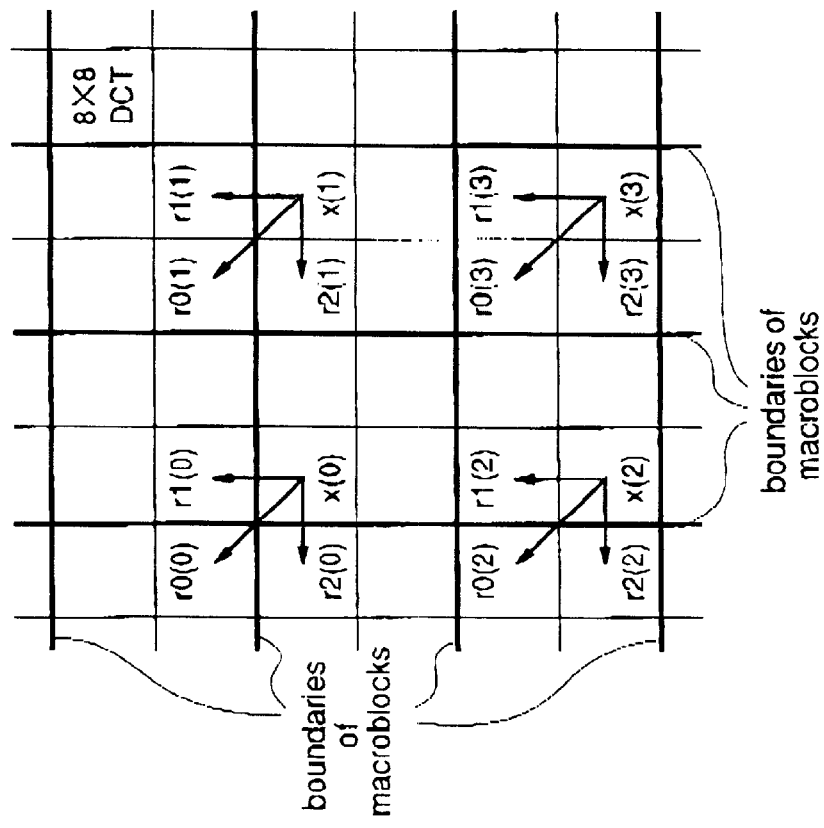

First of all, when the target block has been processed by frame DCT, prediction is carried out as follows (hereinafter referred to as "frame prediction"). As shown in FIG. 4(a), a block positioned diagonally to the upper left of a target block x(i) is a reference block r0(i), a block positioned above and adjacent to the target block x(i) is a reference block r1(i), and a block positioned at the left of and adjacent to the target block x(i) is a reference block r2(i). When the target block x(i) shown in FIG. 4(a) has been subjected to frame DCT, the reference blocks r0(i), r1(i), and r2(i) are spatially nearest to the target block x(i) and, therefore, DCT coefficients of these reference blocks have high correlation with DCT coefficients of the target block x(i).

On the other hand, when the target block has been processed by field DCT, prediction is carried out as follows (hereinafter referred to as "field prediction"). As shown in FIG. 4(b), a block positioned above and one-block spaced apart from a target block x(i) is a reference block r1(i), a block positioned at the left of and adjacent to the reference block r1(i) is a reference block r0(i), and a block positioned at the left of and adjacent to the target block x(i) is a reference block r2(i). When the target block x(i) has been subjected to field DCT, the reference blocks r0(i), r1(i), and r2(i) are spatially nearest to the target block x(i) in the same field and, therefore, DCT coefficients of these reference blocks have high correlation with DCT coefficients of the target blocks x(i).

Hereinafter, the procedure of the adaptive intra-frame DCT coefficient prediction method according to the first embodiment will be described using FIGS. 5 to 11.

Figure 5:
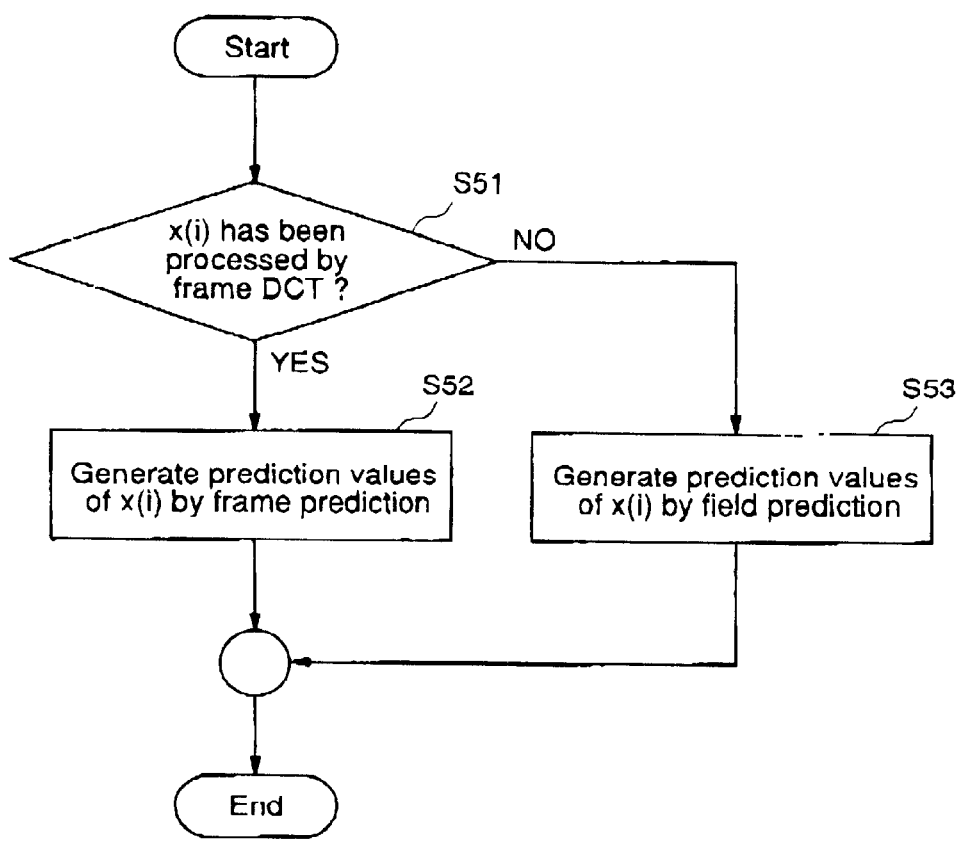
FIG. 5 is a flowchart showing process steps in adaptive intra-frame DCT coefficient prediction, employed by the image coding apparatus according to the first embodiment and the image decoding apparatus according to the second embodiment.

FIG. 5 is a flowchart showing the procedure of the adaptive intra-frame DCT coefficient prediction method.

In step 51, the DCT type of the target block x(i) to be coded is decided. The following steps depend on the result of this decision.

When the target block x(i) has been processed by frame DCT, in step S52, frame prediction is carried out using the reference blocks r0(i), r1(i), and r2(i) for the target block x(i) shown in FIG. 4(a), thereby to generate prediction values of DCT coefficients of the target x(i).

On the other hand, when the target block x(i) has been processed by field DCT, in step S53, field prediction is carried out using the reference blocks r0(i), r1(i), and r2(i) for the target block x(i) shown in FIG. 4(b), thereby to generate prediction values of DCT coefficients of the target block x(i).

As described above, since the reference blocks used for prediction are selected according to the DCT type of the target block x(i), DCT coefficients of reference blocks having high correlation with DCT coefficients of the target block x(i) are used for prediction, resulting in highly-efficient prediction.

Next, the procedure of the frame prediction method in step S52 shown in FIG. 5 will be described in detail using a flowchart of FIG. 6.

Figure 6:
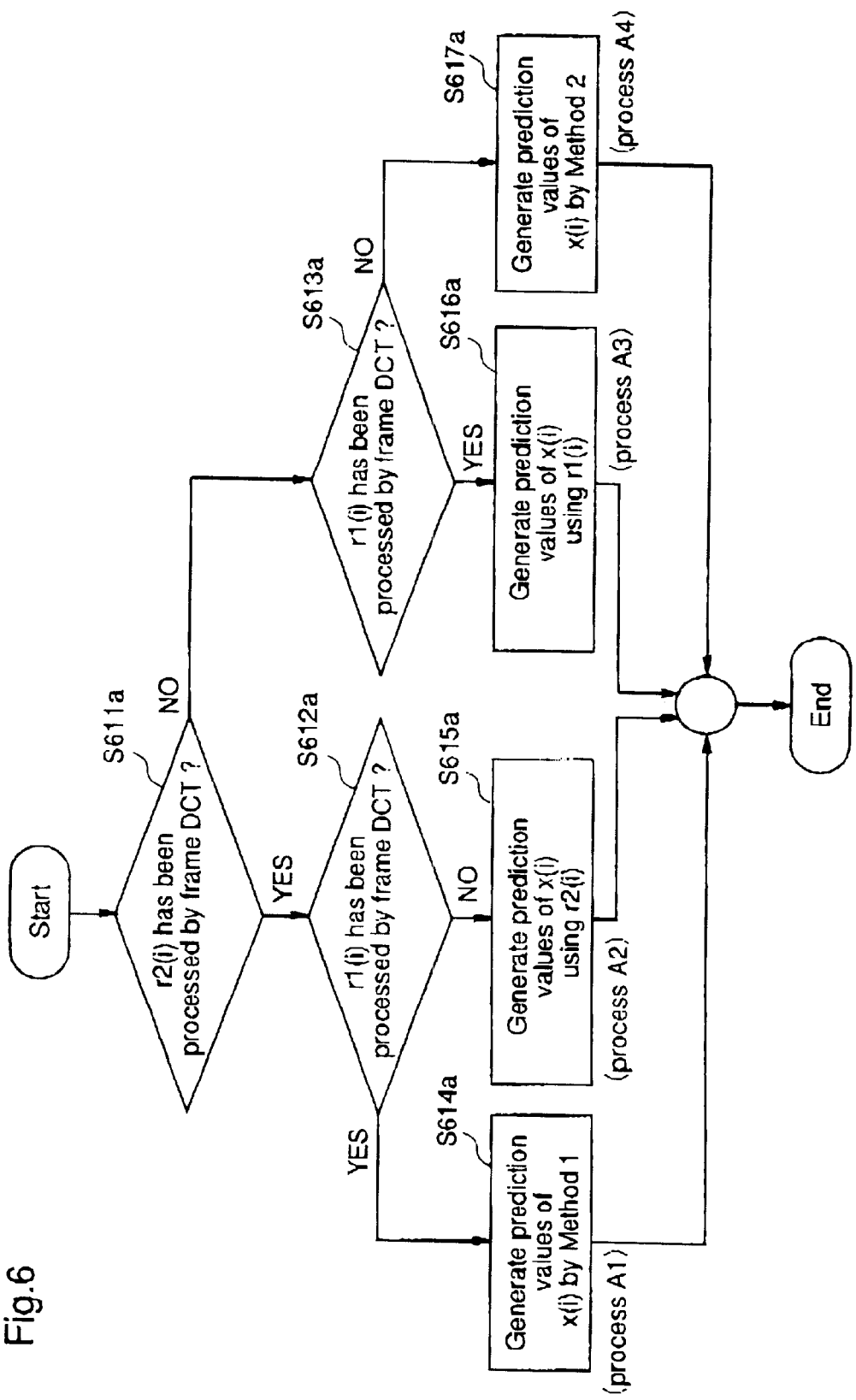
FIG. 6 is a flowchart showing a frame prediction method employed in the prediction process by the image coding apparatus according to the first embodiment and the image decoding apparatus according to the second embodiment.

In FIG. 6, r0(i), r1(i), r2(i) and x(i) denote the reference blocks and the target block shown in FIG. 4(a), respectively. In the frame prediction according to the procedure of FIG. 6, reference blocks processed by frame DCT, i.e., those having the same DCT type as the target block x(i), are used for prediction with priority.

Initially, in step S611a, the DCT type of the reference blocks r2(i) at the left of the target block x(i) is decided. The following steps depend on the result of this decision. Next, in steps S612a and S613a, the DCT type of the reference block r1(i) above the target block x(i) is decided. The following steps depend on the result of this decision. According to the DCT types of the reference blocks r1(i) and r2(i), the frame prediction shown in FIG. 6 is divided into four processes steps (A1)~(A4) as follows.

(A1) When both of the reference blocks r1(i) and r2(i) have been processed by frame DCT, in step S614a, with reference to the DCT coefficients of the reference blocks r0(i), r1(i), and r2(i), prediction values of DCT coefficients of the target block x(i) are generated by "Method 1" which is described later.

(A2) When the reference block r1(i) has been processed by field DCT while the reference block r2(i) has been processed by frame DCT, in step S615a, prediction values of DCT coefficients of the target block x(i) are generated using the DCT coefficients of the reference block r2(i). This is similar to the conventional method already described with respect to FIG. 15, i.e., to generate prediction values of DCT coefficients of the block X from the DCT coefficients of block R2.

(A3) When the reference block r1(i) has been processed by frame DCT while the reference block r2(i) has been processed by field DCT, in step S616a, prediction values of DCT coefficients of the target block x(i) are generated using the DCT coefficients of the reference block r1(i). This is similar to the conventional method already described with respect to FIG. 15, i.e., to generate prediction value of DCT coefficients of the block X from the DCT coefficients of block R1.

(A4) When both of the reference blocks r1(i) and r2(i) have been processed by field DCT, in step S617a, with reference to the DCT coefficients of these reference blocks r0(i), r1(i), and r2(i), prediction values of the target block x(i) are generated by "Method 2" which is described later.

In step S617a, instead of referring to the DCT coefficients of the reference blocks r0(i), r1(i) and r2(i), a prescribed value, such as 0, may be used as a prediction value. Further, steps S613a and S617a maybe dispensed with for simplification. In this case, when it is decided in step S611a that the reference block r2(i) has not been processed by frame DCT, prediction values of DCT coefficients of the target block x(i) are generated using the DCT coefficients of the reference block r1(i) in step S616a.

Next, the procedure of the field prediction method in step S53 shown in FIG. 5 will be described in detail using a flowchart of FIG. 7.

Figure 7:
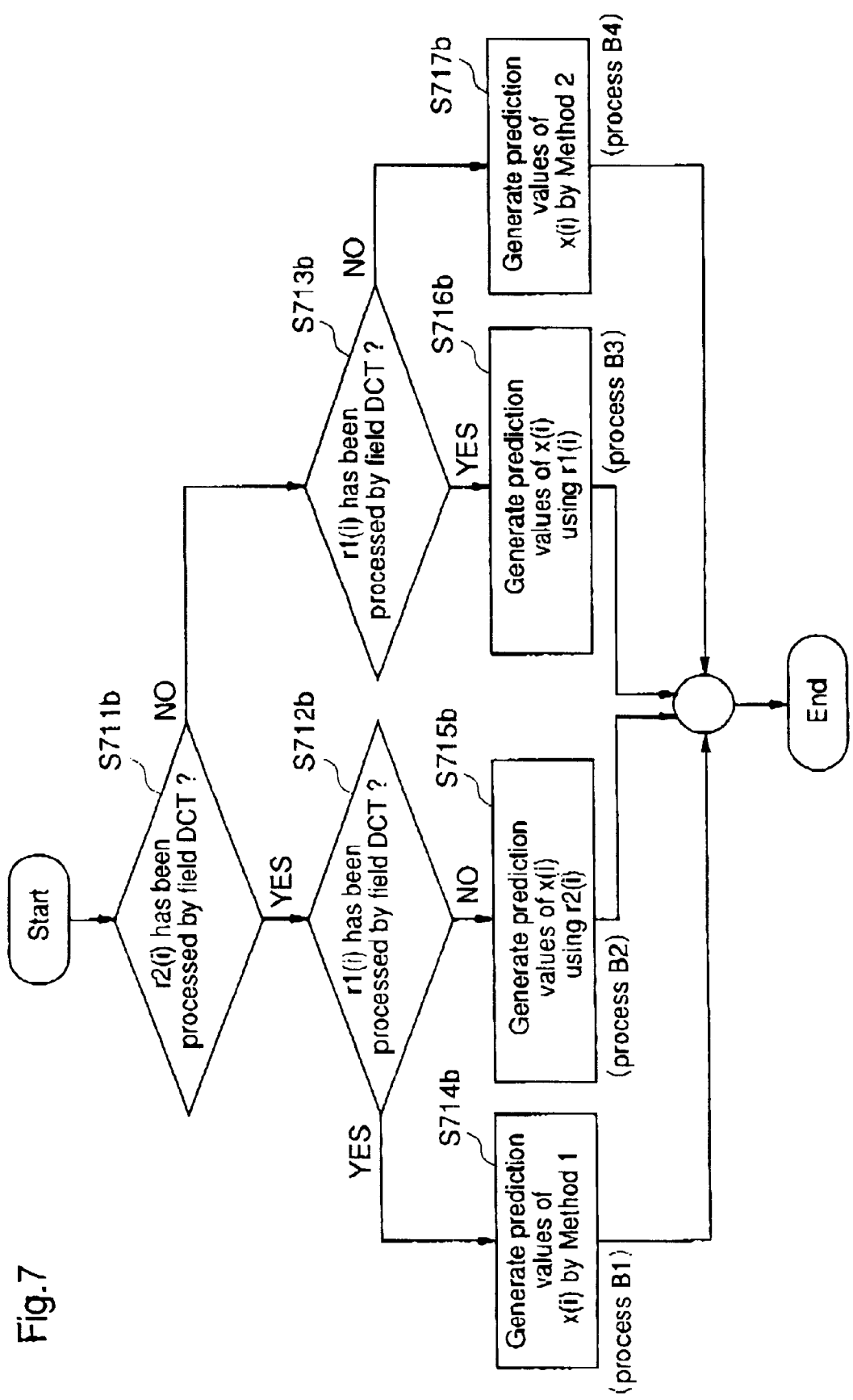
FIG. 7 is a flowchart showing a field prediction method employed in the prediction process by the image coding apparatus according to the first embodiment and the image decoding apparatus according to the second embodiment.

The procedure of the field prediction method shown in FIG. 7 is fundamentally identical to the procedure of the frame prediction method shown in FIG. 6 except that "frame" is replaced with "field".

However, in FIG. 7, r0(i), r1(i), r2(i) and x(i) denote the reference blocks and the target block shown in FIG. 4(b), respectively.

That is, in the field prediction according to the procedure of FIG. 7, reference blocks processed by field DCT, i.e., those having the same DCT type as the target block x(i), are used for prediction with priority.

Initially, in step S711b, the DCT type of the reference block r2(i) at the left of the target block x(i) is decided. The following steps depend on the result of this decision. Next, in steps S712b and S713b, the DCT type of the reference block r1(i) above the target block x(i) is decided. The following steps depend on the result of this decision. According to the DCT types of the reference blocks r1(i) and r2(i), the field prediction shown in FIG. 7 is divided into four process steps (B1)~(B4) as follows.

(B1) When both of the reference blocks r1(i) and r2(i) have been processed by field DCT, in step S714b, with reference to the DCT coefficients of the reference blocks r0(i), r1(i), and r2(i), prediction values of DCT coefficients of the target block x(i) are generated by "Method 1" which is described later.

(B2) When the reference block r1(i) has been processed by frame DCT while the reference block r2(i) has been processed by field DCT, in step S715a, prediction values of DCT coefficients of the target block x(i) are generated using the DCT coefficients of the reference block r2(i). This is similar to the conventional method already described with respect to FIG. 15, i.e., to generate prediction values of DCT coefficients of the block X from the DCT coefficients of block R2.

(B3) When the reference block r1(i) has been processed by field DCT while the reference block r2(i) has been processed by frame DCT, in step S716b, prediction values of DCT coefficients of the target block x(i) are generated using the DCT coefficients of the reference block r1(i). This is similar to the conventional method already described with respect to FIG. 15, i.e., to generate prediction values of DCT coefficients of the block X from the DCT coefficients of block R1.

(B4) When both of the reference blocks r1(i) and r2(i) have been processed by frame DCT, in step S717b, with reference to the DCT coefficients of the reference blocks r0(i), r1(i), and r2(i), prediction values of the target block x(i) are generated by "Method 2" which is described later.

In step S717b, instead of referring to the DCT coefficients of the reference blocks r0(i), r1(i) and r2(i), a prescribed value, such as 0, may be used as a prediction value. Further, steps S713b and S717b may be dispensed with for simplification. In this case, when the decision in step S711b is that the reference block r2(i) has not been processed by field DCT, prediction values of DCT coefficients of the target block x(i) are generated using the DCT coefficients of the reference block r1(i) in step S716b.

In the prediction methods according to the procedures shown in FIGS. 6 and 7, since blocks having the same DCT type as the target block, i.e., reference blocks of which DCT coefficients have high correlation with those of the target block, are used with priority for prediction of the target block, the prediction efficiency is improved.

Hereinafter, the prediction value generating method based on "Method 1" employed in step S614a or "Method 2" employed in step S617a will be described using a flowchart of FIG. 8.

Figure 8:
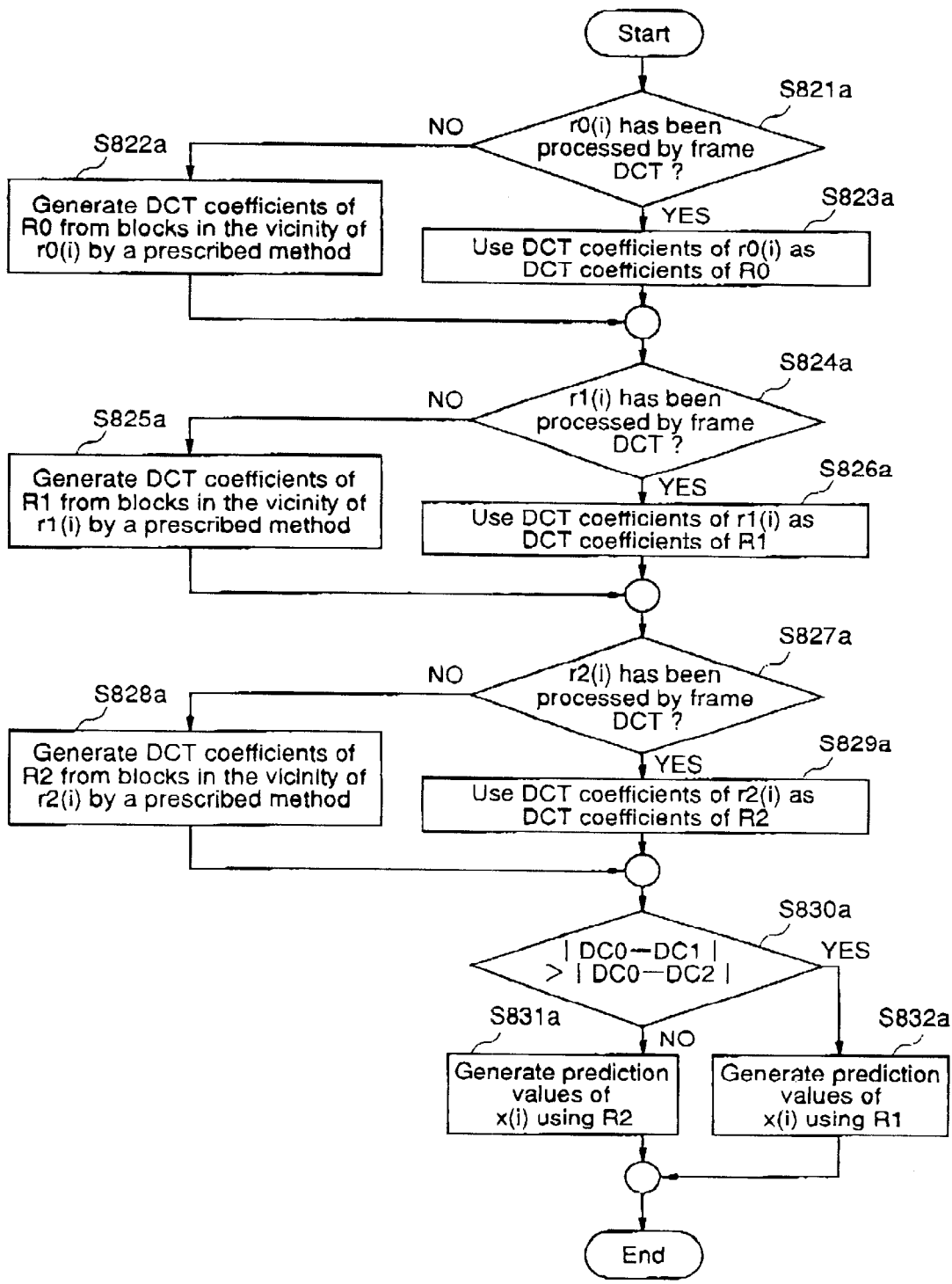
FIG. 8 is a flowchart showing an example of a prediction value generating method in the above-described frame prediction.
Figure 15:
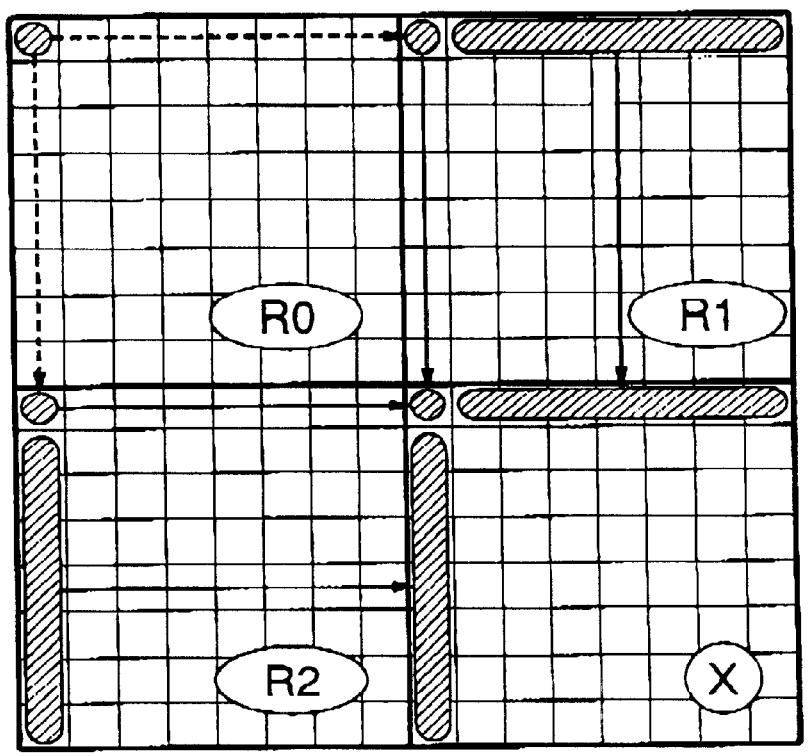
FIG. 15 is a diagram for explaining an intra-frame DCT coefficient prediction method using a conventional image processing apparatus.
Figure 16:
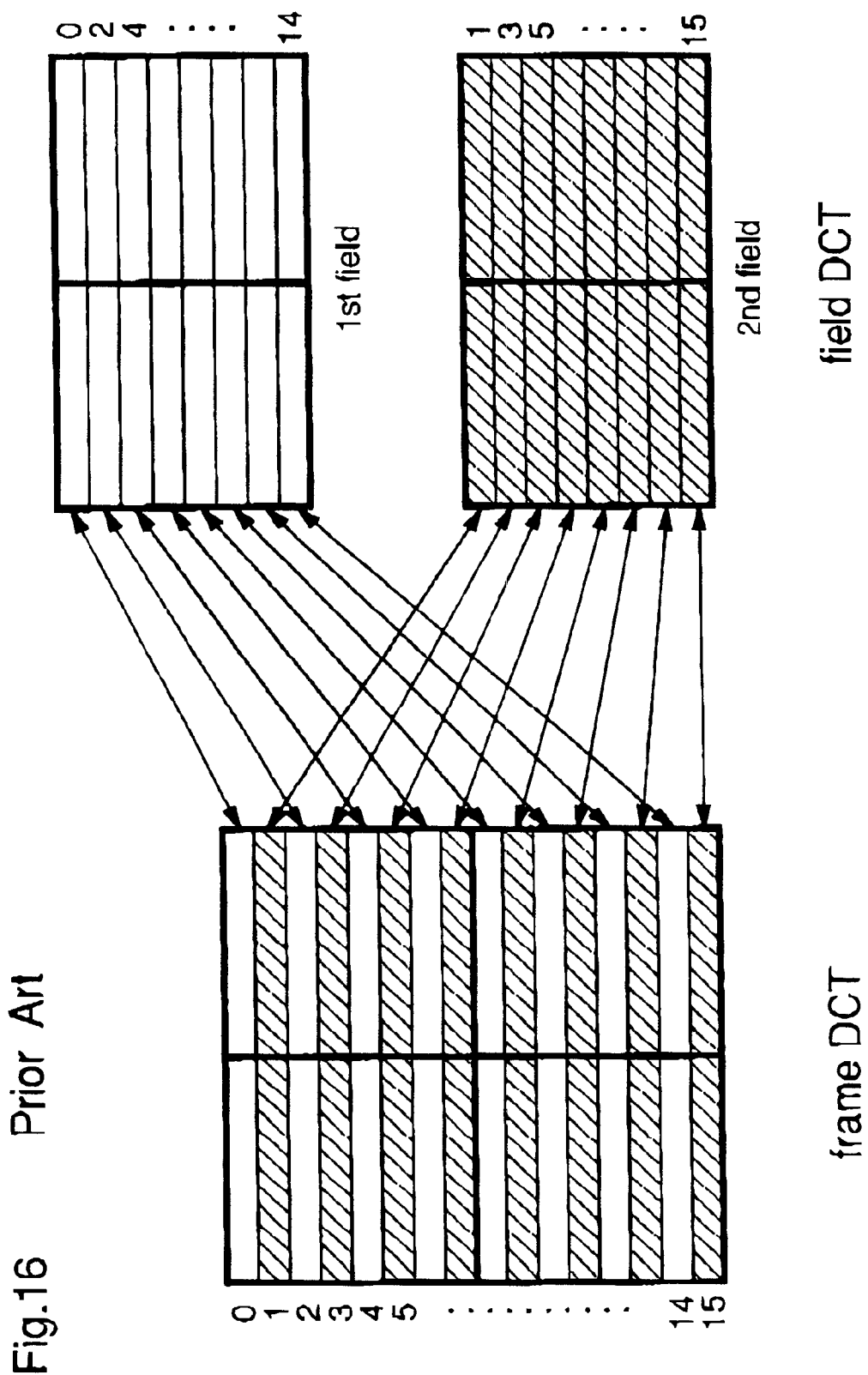
FIG. 16 is a schematic diagram for explaining rearrangement of scanning lines when frame/filed DCT switching is carried out.

In the method of FIG. 8, in order to perform the same process as the conventional DCT coefficient prediction, in the process steps from S821a to S829a, a virtual memory space (a virtual buffer) for storing DCT coefficients of the four blocks shown in FIG. 15 is presumed, and the conventional DCT coefficient prediction method is applied to the respective blocks on the virtual buffer.

In FIG. 8, R0, R1, and R2 denote reference blocks on the virtual buffer, and DC0, DC1, and DC2 denote DC components of DCT coefficients of the reference blocks R0, R1, and R2, respectively. Further r0(i), r1(i), r2(i), and x(i) denote reference blocks and a target block having the positional relationships shown in FIG. 4(a).

Initially, the DCT type of the reference block r0(i) is decided in step S821a, and the following process of generating DCT coefficients of the reference blocks R0 (step S822a or S823a) depends on the result of the decision in step S821a.

To be specific, when it is decided that the reference block r0(i) has been processed by field DCT, in step S822a, DCT coefficients are generated by a prescribed method from blocks in the vicinity of the reference block r0(i), and the DCT coefficients so generated are stored in the virtual buffer as DCT coefficients of the reference block R0. On the other hand, when it is decided in step S821a that the reference block r0(i) has been processed by frame DCT, in step S823a, DCT coefficients of the reference block r0(i) are stored in the virtual buffer as DCT coefficients of the reference block R0. Likewise, DCT coefficients of the reference block R1 are generated in steps S824a, S825a, and S826a, and DCT coefficients of the reference block R2 are generated in steps S827a, S828a, and S829a. These DCT coefficients are stored in the virtual buffer.

Subsequent process steps are identical to those of the conventional DCT coefficient prediction method. In step S830a, the absolute value of a difference in DC components of DCT coefficients between the reference block R0 and the reference block R1 ($|DC0-DC1|$) is compared with the absolute value of a difference of DC components of DCT coefficients between the reference block R0 and the reference block R2 (|DC0−DC2|). When |DC0−DC2| is smaller than |DC0−DC1|, in step S832a, prediction values of DCT coefficients of the target block x(i) are generated using the DCT coefficients of the reference block R1.

When |DC0−DC2| is not smaller than |DC0−DC1|, in step S831a, prediction values of DCT coefficients of the target block x(i) are generated using the DCT coefficients of the reference block R2.

With respect to "Method 1" used in step S614a shown in FIG. 6, since it is known that the DCT type of the reference blocks r1(i) and r2(i) is frame DCT, steps S824a, S827a, S825a, and S828a shown in FIG. 8 can be dispensed with in this case.

Next, the procedure based on "Method 1" employed in step S714b or "Method 2" employed in step S717b shown in FIG. 7 will be described using a flowchart of FIG. 9.

Figure 9:
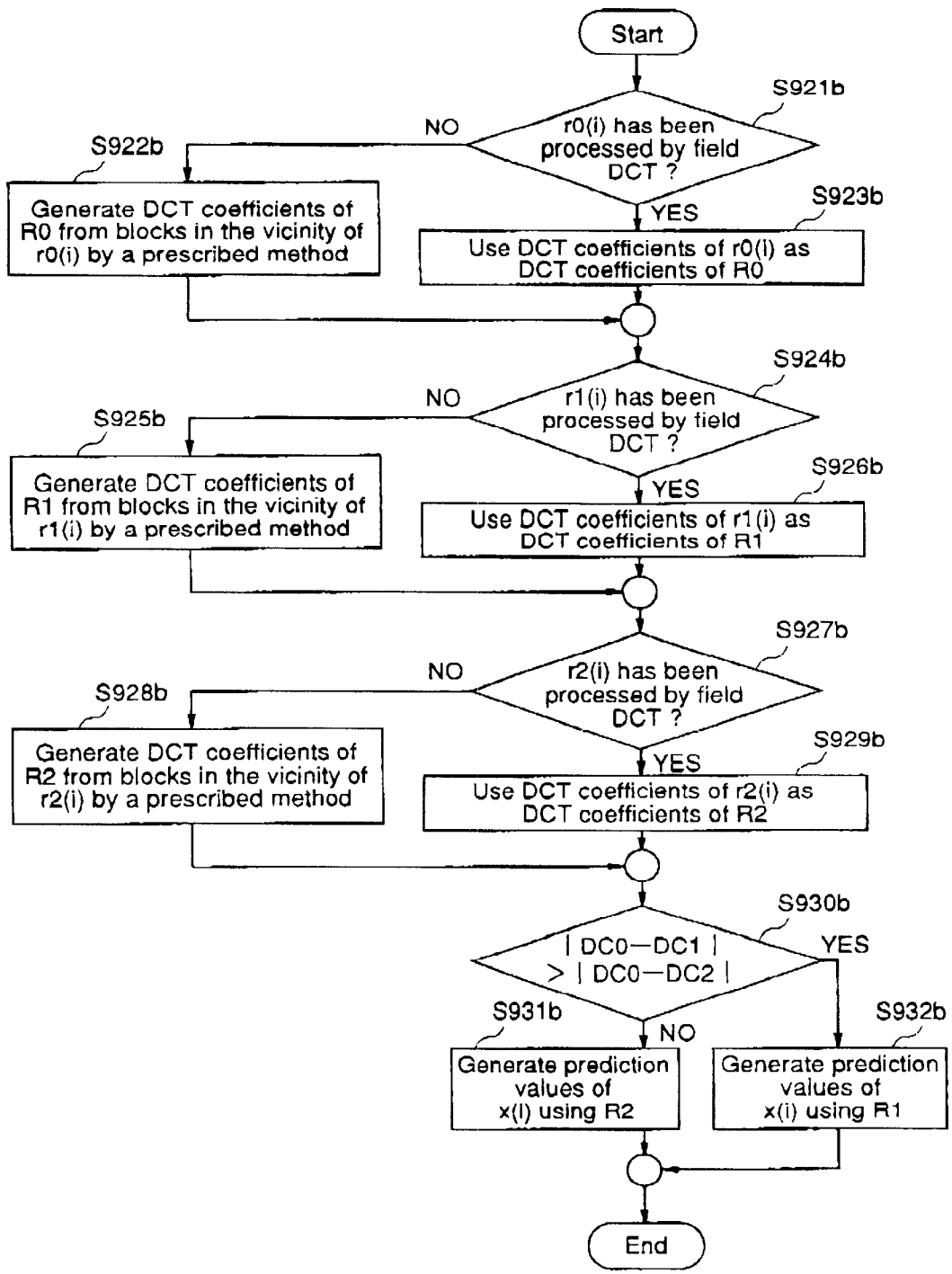
FIG. 9 is a flowchart showing an example of a prediction value generating method in the above-described field prediction.

The procedure shown in the flowchart of FIG. 9 is fundamentally identical to the procedure shown in the flowchart of FIG. 8 except that the step of deciding whether each block has been processed by frame DCT or not is replaced with the step of deciding whether each block has been processed by field DCT or not. In FIG. 9, r0(i), r1(i), r2(i), and x(i) denote reference blocks and a target block having the positional relationships shown in FIG. 4(b).

Initially, the DCT type of the reference block r0(i) is decided in step S921b, and the following process of generating DCT coefficients of the reference block R0 (step S922b or S923b) depends on the result of the decision in step S921b.

To be specific, when it is decided that the reference block r0(i) has been processed by frame DCT, in step S922b, DCT coefficients are generated by a prescribed method from blocks in the vicinity of the reference blocks r0(i), and the DCT coefficients so generated are stored in the virtual buffer as DCT coefficients of the reference block R0. On the other hand, when it is decided in step S921b that the reference r0(i) has been processed by field DCT, in step S923b, DCT coefficients of the reference block r0(i) are stored in the virtual buffer as DCT coefficients of the reference block R0. Likewise, DCT coefficients of the reference block R1 are generated in steps S924b, S925b, and S926b, and DCT coefficients of the reference block R2 are generated in steps S927b, S928b, and S929b. These DCT coefficients are stored in the virtual buffer.

Subsequent process steps are identical to those of the conventional DCT coefficient prediction method. In step S930b, the absolute value of a difference in DC components of DCT coefficients between the reference block R0 and the reference block R1 (|DC0−DC1|) is compared with the absolute value of a difference in DC components of DCT coefficients between the reference block R0 and the reference block R2 (|DC0−DC2|). When |DC0−DC2| is smaller than |DC0−DC1|, in step S932b, prediction values of DCT coefficients of the target block x(i) are generated using the DCT coefficients of the reference block R1.

When |DC0−DC2| is not smaller than |DC0−DC1|, in step S931b, prediction values of DCT coefficients of the target block x(i) are generated using the DCT coefficients of the reference block R2.

With respect to "Method 1" used in step S714b shown in FIG. 7, since it is known that the DCT type of the reference blocks r1(i) and r2(i) is field DCT, steps S924b, S927b, S925b, and S928b shown in FIG. 9 can be dispensed with in this case.

As described above, in prediction of DCT coefficients of a target block, when it is necessary to refer to DCT coefficients of a reference block of which DCT type is different from that of the target block, the DCT coefficients of this reference block are not referred to, but DCT coefficients having frequency characteristics similar to those of the DCT type of the target block are generated from blocks in the vicinity of the reference block, and DCT coefficients of the target block are predicted using the DCT coefficients so generated, whereby the prediction efficiency is improved.

Figure 10:
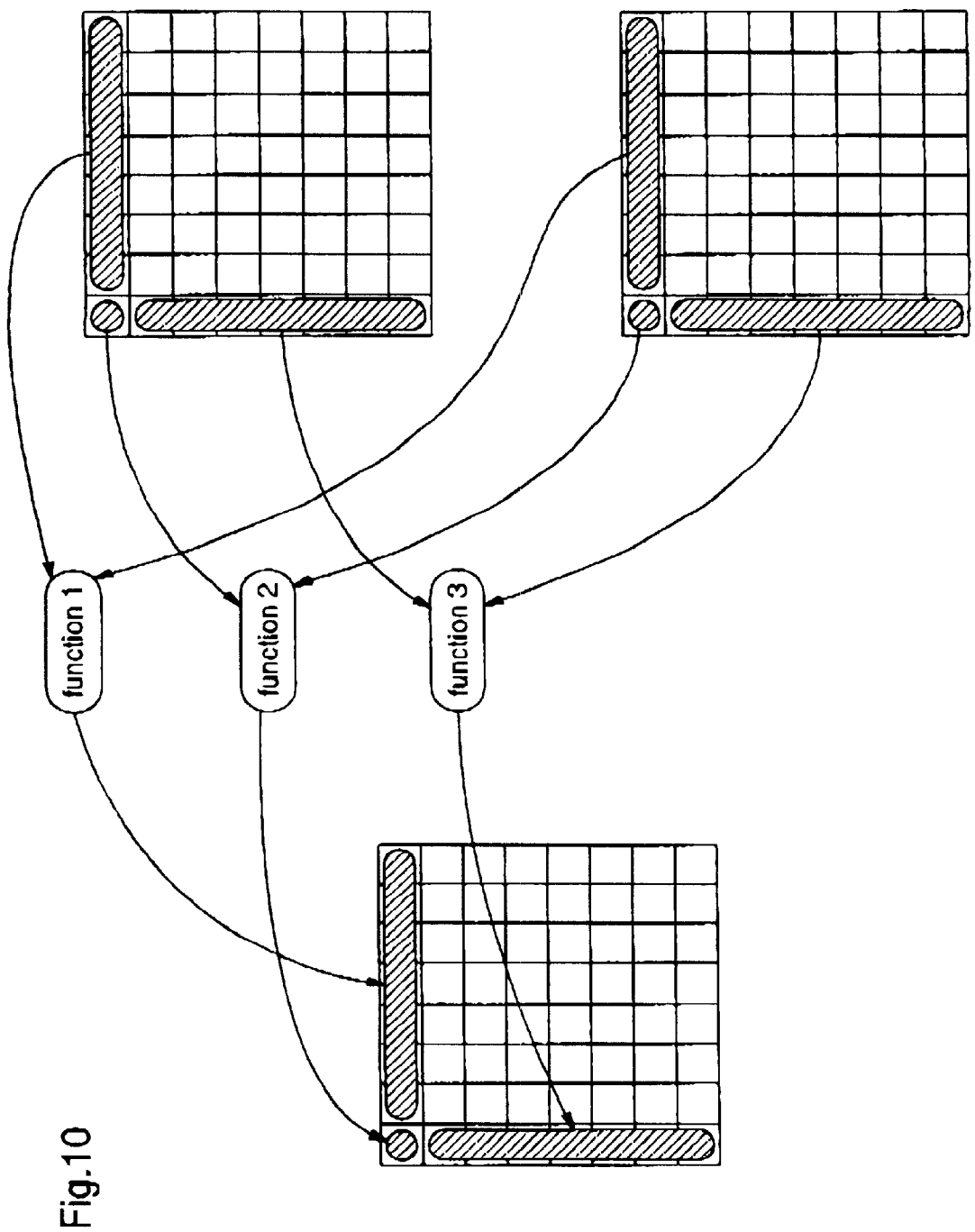
FIG. 10 is a diagram for explaining an example of a virtual buffer DCT coefficient generating method employed in the prediction process by the image coding apparatus according to the first embodiment and the image decoding apparatus according to the second embodiment.

FIG. 10 is a schematic diagram for explaining a method for generating DCT coefficients from blocks in the vicinity of a reference block r, in steps S822a, S825a, S828a shown in FIG. 8, and steps S922b, S925b, and S928b shown in FIG. 9.

In FIG. 10, r denotes any of the reference blocks r0(i), r1(i), and r2(i) in the frequency domain, and R denotes any of the reference blocks R0, R1, and R2 on the virtual buffer.

In the process of generating DCT coefficients from blocks in the vicinity of the reference block r in steps S822a, S825a, S828a shown in FIG. 8 and steps S922b, S925b, and S928b shown in FIG. 9, DCT coefficients are generated using a prescribed function from DCT coefficients of two blocks in the vicinity of the reference block r as shown in FIG. 10, and the DCT coefficients so generated are used as DCT coefficients of the reference block R on the virtual buffer.

Figure 11:
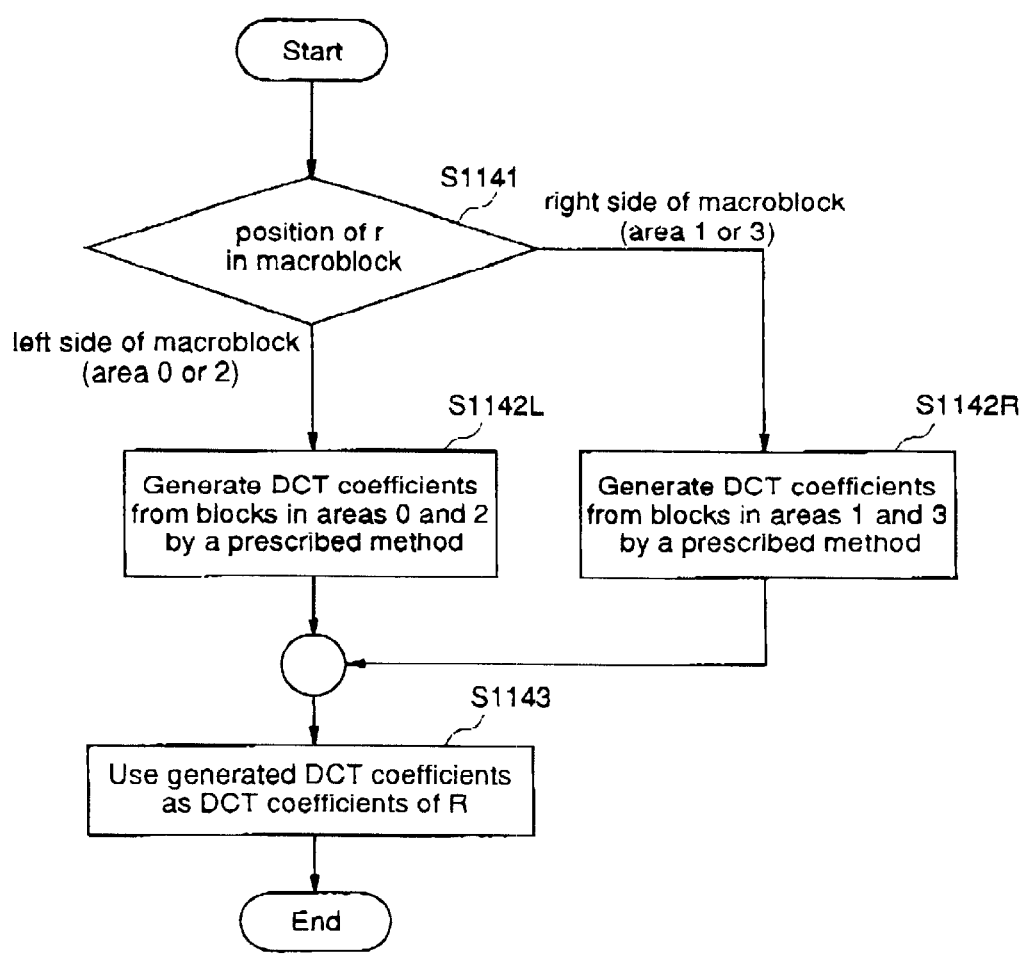
FIG. 11 is a flowchart showing an example of a virtual buffer DCT coefficient generating method employed in the prediction process by the image coding apparatus according to the first embodiment and the image decoding apparatus according to the second embodiment.

FIG. 11 is a flowchart showing the procedure of generating DCT coefficients of the reference block R on the virtual buffer. In FIG. 11, different processed are carried out according to the position of the reference block r in the macroblock in the DCT domain.

For example, when the reference block r is positioned in the area (0) or (2) in the macroblock in the DCT domain, i.e., when it is positioned in the left-side area of the macroblock, in step S1142L, as shown in FIG. 10, DCT coefficients of the reference block R on the virtual buffer are generated using a prescribed function from DCT coefficients of blocks positioned in the areas (0) and (2) of the macroblock in the DCT domain, which areas include the reference blocks r. When, the reference r is positioned in the area (1) or (3) in the macroblock in the DCT domain, i.e., when it is positioned in the right-side area of the macroblock, in step S1142R, DCT coefficients of the reference block R on the virtual buffer are generated using a prescribed function from DCT coefficients of blocks positioned in the areas (1) and (3) of the macroblock in the DCT domain, which areas include the reference blocks r.

As for the function employed, any function may be employed as long as, with the function, DCT coefficients of the reference block R on the virtual buffer can be uniquely calculated from DCT coefficients of two blocks in the vicinity of the reference block r, for example, a function in which averages or weighed averages of DCT coefficients between two blocks in the vicinity of the reference block r in the frequency domain are used as DCT coefficients of the reference block R on the virtual buffer.

Then, in step S1143, the DCT coefficients generated with reference to the two blocks in the frequency domain are used as DCT coefficients of the reference block R on the virtual buffer.

As described above, since DCT coefficients of the reference block R in the virtual area used for prediction are generated from DCT coefficients of two blocks having information of the same area as the reference block r in the spatial domain, it is possible to generate DCT coefficients having frequency characteristics similar to those of DCT coefficients of the DCT type of the target block.

In the adaptive intra-frame DCT coefficient prediction method employed for the first embodiment of the invention, reference blocks used for prediction are selected according to the DCT type of the target block, and DCT coefficients of reference blocks of the same DCT type as the target block are used for prediction with priority. When the DCT type of the reference block is different from that of the target block, from DCT coefficients of blocks in the vicinity of the reference block, DCT coefficients of blocks, which have frequency characteristics similar to those of DCT coefficients of reference blocks having the same DCT type as the target block, are generated for prediction. Therefore, intra-frame prediction for an interlaced image or a specific progressive image is efficiently performed in the DCT domain (frequency components).

As the result, according to the first embodiment of the invention, in the coding process based on MPEG4 for processing an interlaced image or a specific progressive image in which macroblocks of different DCT types (objects to be processed) coexist, since the efficiency of predicting DCT coefficients of a block to be coded is improved by using intra-frame information, it is possible to efficiently perform compressive coding of an image signal by removal or reduction of spatially redundant image information.

In the adaptive intra-frame DCT coefficient prediction method according to the first embodiment, when the DCT coefficients of the reference block r2(i) are used as prediction values of DCT coefficients of the target block x(i), (see FIGS. 4(a) and 4(b)), if the DCT type of the reference block r2(i) is different from that of the target block x(i), only a DC component among the DCT coefficients of the reference block r2(i) may be used as a prediction value for the target block x(i).

Further, in the prediction method according to the first embodiment, in steps S923b, S926b, and S929b, DCT coefficients of the reference block R (to be specific, reference blocks R0, R1, R2) on the virtual buffer used for prediction of DCT coefficients of the target block are generated from the DCT coefficients of the reference block r (to be specific, reference blocks r0(i), r1(i), r2(i)). However, in steps S923b, S926b, and S929b, as described with respect to steps S922b, S925b, and S928b, DCT coefficients may be generated using a prescribed function from DCT coefficients of two blocks in the vicinity of the reference block r in the spatial domain (to be specific, reference blocks r0(i), r1(i), r2(i), and the generated DCT coefficients may be used as DCT coefficients of the reference block R on the virtual buffer.

Furthermore, in the field prediction shown in FIG. 7, one of the four processed B1–B4 is carried out according to the DCT type of the reference block r2(i) at the lift of the target block x(i) and the DCT type of the reference block r1(i) above the target block x(i). However, among these processes B1, B3, and B4 may be replaced with the following processes B1', B3', and B4'.

With respect to the process B3', a coded block positioned just above the target block x(i) (i.e., in FIG. 4(b), a coded block positioned between the target block x(i) and the coded block r1(i) is used as a reference block, and DCT coefficients of this reference block are used as prediction values of DCT coefficients of the target block.

With respect to the processes B1' and B4', in steps S922b and S923b, the reference block r0(i) and a coded block positioned between the reference block r0(i) and the reference block r2(i) are subjected to weighted averaging at a weighting ratio of 0:1, thereby generating DCT coefficients of the reference block R0 on the virtual buffer. In steps S925b and S926b, the reference block r1(i) and a coded block positioned between the reference block r1(i) and the target block x(i) are subjected to weighted averaging at a weighting ration of 0:1, thereby generating DCT coefficients of the reference block R1 on the virtual buffer. In steps S928b and S929b, the reference block r2(i) and a coded block positioned between the reference block r2(i) and the reference block r0(i) are subjected to weighted averaging at a weighting ratio of 1:0, thereby generating DCT coefficients of the reference block R1 on the virtual buffer. In the processes B1' and B4', it is presumed that the positions of the respective blocks r0(i)~r2(i) relative to the target block x(i) are as shown in FIG. 4(b).

In other words, in the processes B1' and B440, weighted averaging between the reference block r0(i) is carried out with a weighting ratio of 1 for one of these blocks nearer to the target block x(i), and weighted averaging between the reference block r1(i) and a coded block just beneath the reference block r1(i) is carried out with a weighting ratio of 1 for one of these blocks nearer to the target block x(i) and, furthermore, weighted averaging between the reference block r2(i) and a coded block just above the reference block r2(i) is carried out with a weighting ratio of 1 for one of these blocks nearer to the target block x(i).

In this case, operation of the weighted averaging is simplified. Further, since prediction values of frequency components of a subblock to be coded are generated with reference to frequency components of an already coded subblock which is spatially nearest to the subblock to be coded, the prediction efficiency in the coding process for an interlaced image or a specific progressive image is improved by the adaptive intra-frame DCT coefficient prediction method using relatively simple operation.

[Embodiment 2]

An image processing apparatus (image decoding apparatus) and an image decoding method (image decoding method) according to a second embodiment of the present invention are characterized by that decoding of a coded image signal is performed using the adaptive intra-frame DCT coefficients prediction method which is used for the image coding apparatus and method according to the first embodiment.

Figure 2:
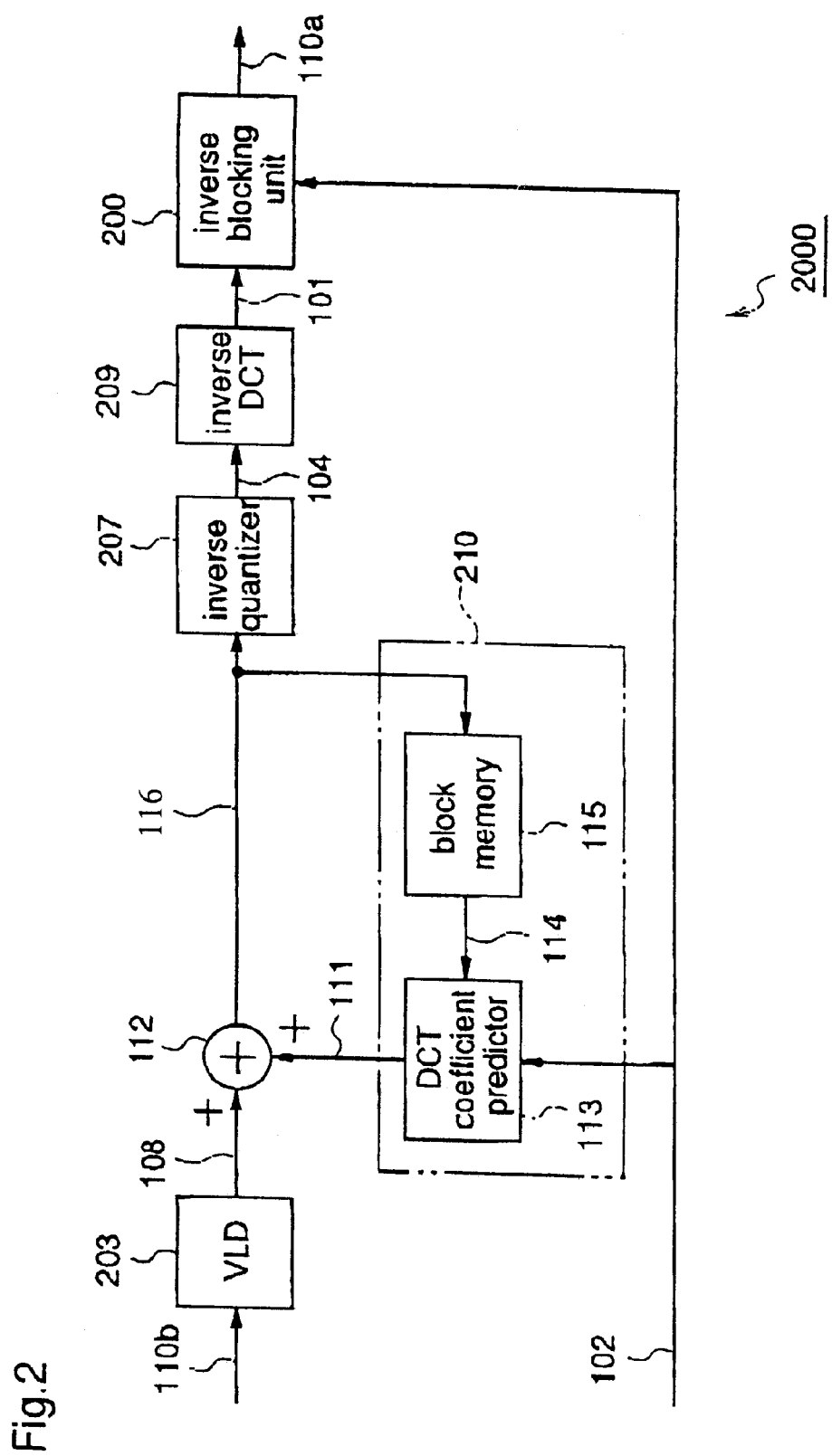
FIG. 2 is a block diagram illustrating an image processing apparatus (image decoding apparatus) according to a second embodiment of the invention.

FIG. 2 is a block diagram illustrating an image decoding apparatus 2000 according to the second embodiment, wherein the same reference numerals as those in FIG. 1 designate the same or corresponding parts.

The image decoding apparatus 2000 receives a coded image signal (bit stream) obtained by coding an image signal by the image coding apparatus 1000 according to the first embodiment, and subjects the coded image signal to decoding using the adaptive intra-frame DCT coefficient prediction method.

More specifically, the image decoding apparatus 2000 comprises a variable-length decoder (VLD) 203 which receives a bit stream 110b output from the image coding apparatus 1000, and subjects the bit stream 110b to variable-length decoding by data analysis to restore DCT coefficient difference values 108 of a block to be decoded (i.e., difference values between the quantized DCT coefficients 107 and the block to be coded and the intra-frame prediction values 111 thereof; an intra-frame prediction unit 210 which generates intra-frame prediction values 111 of the block to be decoded; and an adder 112 which adds the intra-frame prediction values 111 and the DCT coefficient difference values 108 to restore quantized DCT coefficients of the block to be decoded.

The intra-frame prediction unit 210 comprises a block memory 115 which stores the output 106 from the adder 112 as quantized DCT coefficients of a block which has already been decoded; and a DCT coefficient predictor which generates prediction values 111 of quantized DCT coefficients of the block to be decoded, from the quantized DCT coefficients 114 of the decoded block stored in the block memory 115, according to the DCT type signal 102 from the image coding apparatus 1000, by the adaptive intra-frame DCT coefficient prediction method.

Further, the image decoding apparatus 2000 comprises an inverse quantizer 207 which subjects the output 106 from the adder 112 to inverse quantization to restore DCT coefficients of the block to be decoded; an inverse DCT unit 209 which subjects the output from the inverse quantizer 207 to inverse DCT to restore an image signal 101 corresponding to the block to be decoded; and an inverse block unit 200 which receives the output from the inverse DCT unit 209 and restores a scanning-line structure image signal 110a on the basis of the DCT type from the image coding apparatus 1000.

A description is now given of the operation of the image decoding apparatus.

When a coded image signal 110b from the image coding apparatus 1000 is input to the image decoding apparatus 2000, the coded image signal 110b is subjected to variable-length decoding by data analysis in the variable-length decoder 203, and the decoder 203 outputs DCT coefficient difference values 108 of a block to be decoded (hereinafter, referred to as a target block).

The DCT coefficient difference values 108 and added to their prediction values 111 by the adder 112, whereby quantized DCT coefficients 106 of the target block are restored.

The quantized DCT coefficients 106 of the target block are input to the intra-frame prediction unit 210, and stored in the block memory 115 as quantized DCT coefficients of a block which has already been decoded. Further, the quantized DCT coefficients 114 of the decoded block are read from the block memory 115 to the DCT coefficient predictor 113. In the DCT coefficient predictor 113, prediction values of DCT coefficient difference values 108 of a next block to be decoded after the target block are generated by adaptive intra-frame DCT coefficient prediction, with reference to the quantized DCT coefficients from the block memory 115, according to the DCT type signal 102 from the image coding apparatus 1000, in similar manner to the prediction value generating process by the intra-frame prediction unit 110 of the image coding apparatus 1000.

Furthermore, the quantized DCT coefficients 106 are subjected to inverse quantization by the inverse quantizer 207 and transformed to DCT coefficients 104 of the target block, and the DCT coefficients 104 are subjected to inverse DCT by the inverse DCT unit 209 and transformed to an image signal 101 corresponding to the target block.

Thereafter, the image signal 101 corresponding to the target block is input to the inverse block unit 2000, wherein a scanning-line structure image signal 110a is reproduced on the basis of the DCT type signal 102 from the image coding apparatus 1000.

As described above, according to the second embodiment of the invention, since decoding of a coded image signal is carried out using the adaptive intra-frame DCT coefficient prediction method, a coded image signal (bit stream), which has been obtained by subjecting an image signal (an interlaced image or a specific progressive image) to intra-frame predictive coding using adaptive intra-frame DCT coefficient prediction, can be decoded efficiently and correctly by intra-frame prediction in the DCT domain.

[Embodiment 3]

Hereinafter, an image processing apparatus (image coding apparatus) according to a third embodiment of the present invention will be described.

Figure 12:
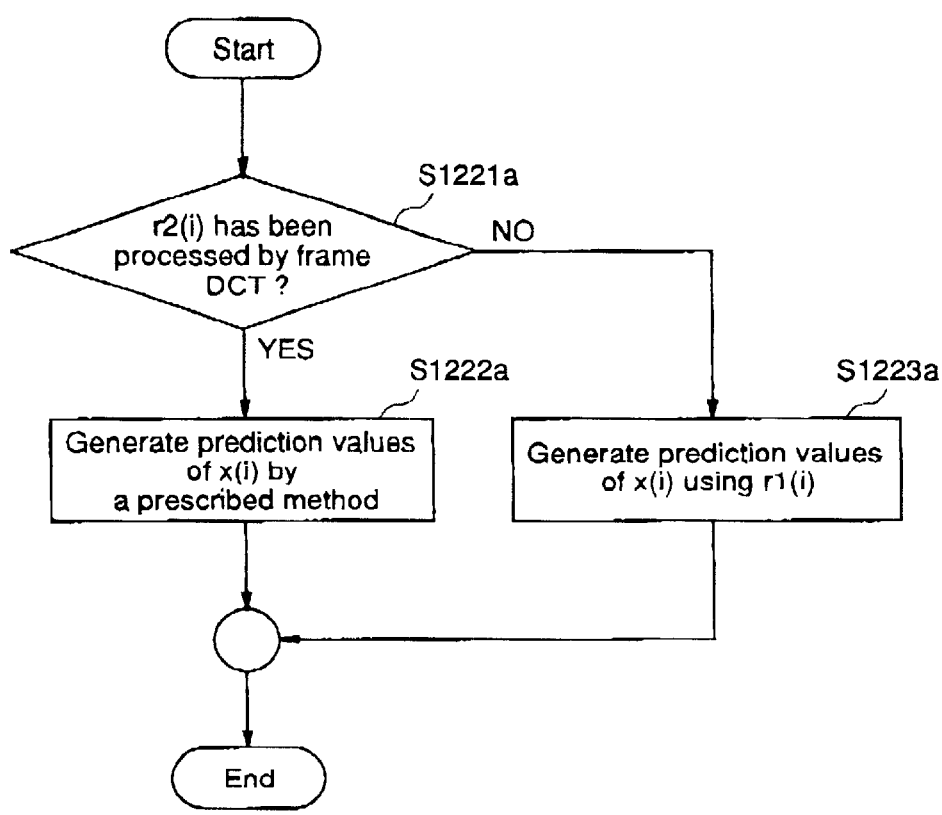
FIG. 12 is a flowchart showing a frame prediction method employed by the image coding apparatus according to the third embodiment and the image decoding apparatus according to the fourth embodiment.
Figure 13:
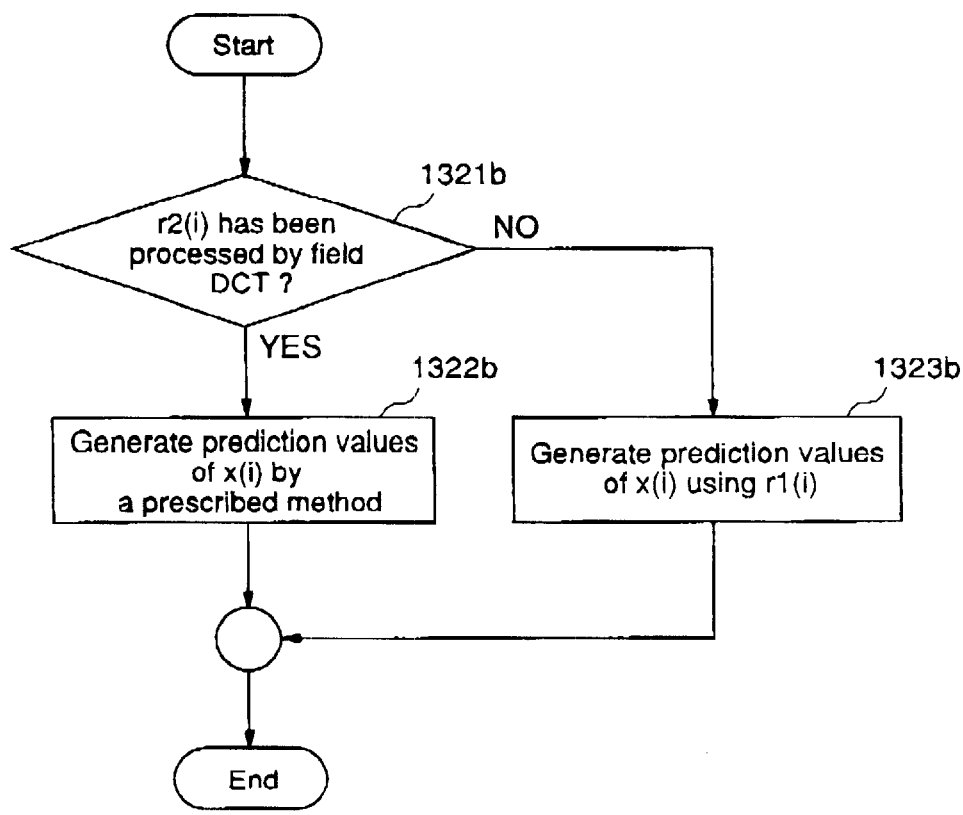
FIG. 13 is a flowchart showing a field prediction method employed by the image coding apparatus according to the third embodiment and the image decoding apparatus according to the fourth embodiment.

The image coding apparatus according to this third embodiment employs the procedure shown in FIG. 12 instead of the procedure of generating prediction values of DCT coefficients of the target block by frame prediction in step S52 shown in FIG. 5, and employs the procedure shown in FIG. 13 instead of the procedure of generating prediction values of DCT coefficients of the target block by field prediction in step S53 shown in FIG. 5.

The adaptive intra-frame DCT coefficient prediction by the image coding apparatus according to this third embodiment is fundamentally identical to that according to the first embodiment except the frame prediction method and the field prediction method and, therefore, only these prediction methods will be described hereinafter using FIGS. 12 and 13.

FIG. 12 is a flowchart showing the procedure according to this third embodiment for implementing the frame prediction method in step S52 shown in FIG. 5. In FIG. 12, r0($i$), r1($i$), r2($i$), and x(i) denote the reference blocks and the target block shown in FIG. 4($a$).

In this third embodiment, initially, in step S1221$a$, the DCT type of the reference block r2($i$) is decided. The subsequent process depends on the result of this decision.

When the reference block r2($i$) has been processed by frame DCT, prediction values of DCT coefficients of the target block x(i) are generated using the prediction value generating method shown in FIG. 8 as "a prescribed method". The prediction value generating method shown in FIG. 8 is already described with respect to the first embodiment and, therefore, does not require repeated description. With respect to "a prescribed method" in step S1222$a$ of FIG. 12, since it is known that the DCT type of r2($i$) is frame DCT, steps S827$a$ and S828$a$ in FIG. 8 can be dispensed with.

On the other hand, when the reference block r2($i$) has been processed by field DCT, prediction values of DCT coefficients of the target block x(i) are generated using the DCT coefficients of the reference block r1($i$), in similar manner to the conventional method shown in FIG. 15 in which prediction values of DCT coefficients of the target block X are generated from the DCT coefficients of the reference block R1.

FIG. 13 is a flowchart showing the procedure according to this third embodiment for implementing the field prediction method in step S53 shown in FIG. 5. Since the process shown in FIG. 13 is fundamentally identical to the process shown in FIG. 12 except that "frame" is replaced with "field", detailed description therefor is omitted. However, in FIG. 13, r0($i$), r1($i$), r2($i$), and x(i) respectively denote the reference blocks and the target block shown in FIG. 4($b$).

As described above, in the adaptive intra-frame DCT coefficient prediction method according to the third embodiment, since the frame prediction method in step S52 in FIG. 5 and the field prediction method in step S53 are simplified as compared with the first embodiment, the intra-frame prediction in the DCT domain during the coding process is simplified, and the processing speed is increased.

[Embodiment 4]

Hereinafter, an image processing apparatus (image decoding apparatus) according to a fourth embodiment of the invention will be described.

The image decoding apparatus according to this fourth embodiment employs the procedure shown in FIG. 12 instead of the procedure of generating prediction values of DCT coefficients of the target block by frame prediction in step S52 shown in FIG. 5, and employs the procedure shown in FIG. 13 instead of the procedure of generating prediction values of DCT coefficients of the target block by field prediction in step S53 shown in FIG. 5.

In the image decoding apparatus so constructed, when the adaptive intra-frame DCT coefficient prediction is carried out, the frame prediction method in step S52 in FIG. 5 and the field prediction method in step S53 are simplified as compared with the second embodiment. Therefore, the intra-frame prediction in the DCT domain during the decoding process is simplified, and the processing speed is increased.

[Embodiment 5]

In an image processing apparatus (an image coding apparatus) and an image processing method (an image coding method) according to a fifth embodiment of the present invention, regardless of DCT type signal of a target block, that is, regardless of whether target block has been processed by the frame DCT or the field DCT, intra-frame coding of an image signal is performed, by generating prediction values of DCT coefficients of the target block from DCT coefficients of a coded block which has a prescribed positional relationship with the coded block. Assume that the DCT type signal indicates whether the target block has been processed by the frame DCT or the field DCT. Also assume that a block is one of 4 subblocks each comprising 8×8 pixels of a macroblock comprising 16×16 pixels. These 4 subblocks are positioned upper left (area (0) in FIG. 3), upper right (area (1) in FIG. 3), lower left (area(2) in FIG. 3), and lower right (area (3) in FIG. 3) in the macroblock, respectively.

Figure 17:
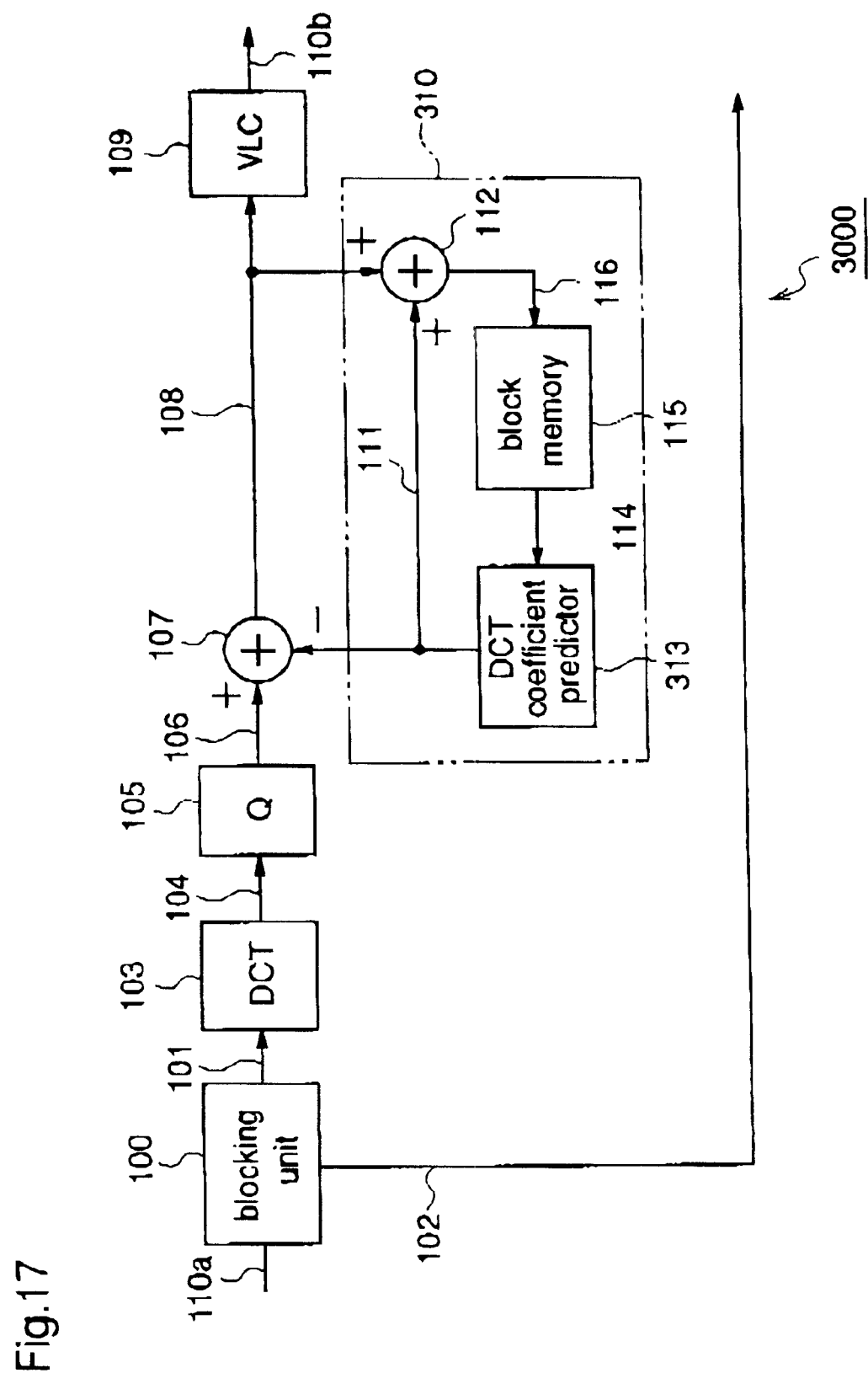
FIG. 17 is a block diagram showing an image coding apparatus according to a fifth embodiment of the invention.

FIG. 17 is a block diagram showing an image coding apparatus of the fifth embodiment, First, construction of the image coding apparatus will be described.

Referring to FIG. 17, there is shown an image coding apparatus 3000 of the fifth embodiment. The image coding apparatus 3000 is used to divide a digital image signal (input image signal) 110*a* into image signals corresponding to plural blocks into which an image space (frame) formed by the signal 110 is divided, and code the resulting image signals of respective blocks for each block.

The image coding apparatus 3000, as in the case of the image coding apparatus 1000 of the first embodiment, includes a blocking unit 100 for performing blocking to divide the image signal 110*a* into image signals corresponding to the respective blocks field by field or frame by frame as processing units of frequency transformation, and outputting the image signals of respective blocks 101 and a DCT type signal 102 indicating a processing unit of the frequency transformation. To be specific, the block unit 100 is used for receiving the input image signal 110*a*, rearranging scanning lines for each macroblock for the field DCT, and outputting an image signal for each block comprising 8×8 pixels of the macroblock, when correlation of pixel values between fields is higher than that in a frame. On the other hand, when the correlation between fields is lower than that in the frame, scanning lines are not rearranged and the input image signal 110*a* is output for each block from the block unit 100.

The scanning lines are rearranged in such a manner that a first field image formed by image signals on odd-numbered horizontal pixel rows (horizontal scanning lines) is positioned at an upper side of the macroblock, i.e., the areas (0) and (1), and a second field image formed by image signals on even-numbered horizontal pixel rows (horizontal scanning lines) is positioned at a lower side of the macroblock, i.e., the areas (2) and (3).

The blocking unit 100 is used for dividing the image signal of the macroblock into image signals corresponding to the areas (0)~(3), and outputting the resulting image signals of respective blocks.

The image coding apparatus 3000, as in the case of the image coding apparatus 1000, further includes a DCT unit 103 for performing DCT to the image signals 101 of the target block, a quantizer 105 for quantizing signals output from the DCT unit 103, an intra-frame prediction unit 310 for generating prediction values 111 of the target block, an adder 107 for subtracting the prediction values 111 from signals 106 (DCT coefficient quantization value) output from the quantizer 105, and outputting DCT coefficient difference values 108, and a VLC 109 for performing variable length coding to the difference values 108 and outputting a bit stream (a coded image signal) 110*b*.

The intra-frame prediction unit 310 comprises an adder 112 for adding the difference values 108 to the prediction values 111, a block memory 115 for storing DCT coefficient quantization values 116 of the coded block output from the adder 112, and a DCT coefficient predictor 313 for generating the prediction values 111 from DCT coefficient quantization values 114 of the coded block adjacent to the target block in an image space.

Figure 19:
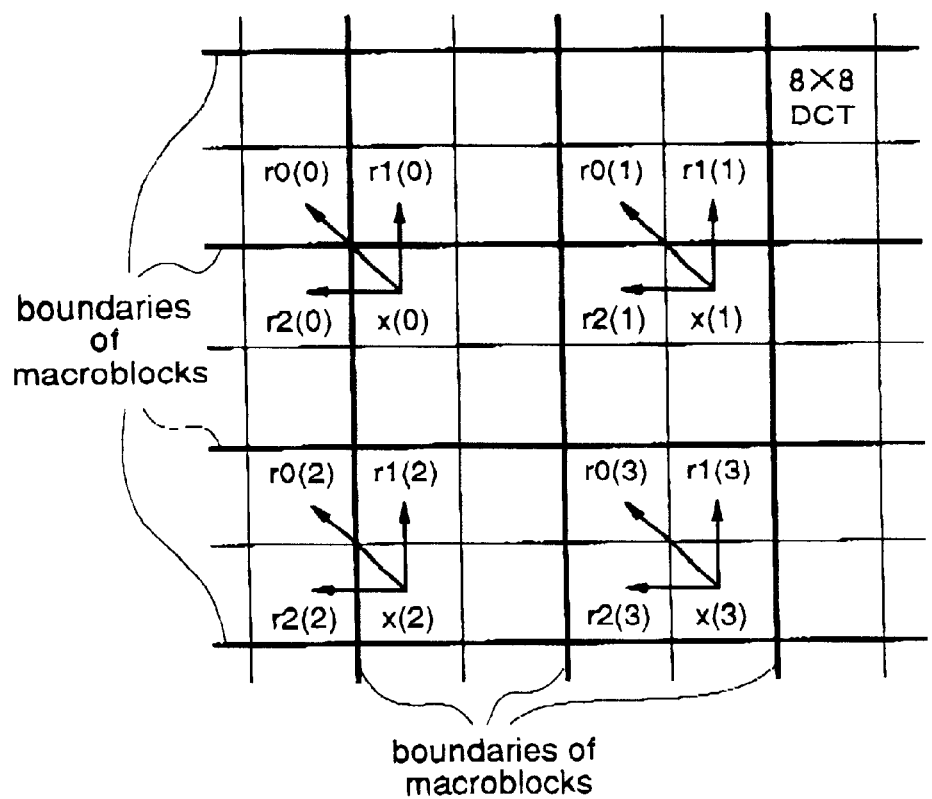
FIG. 19 is a diagram for explaining reference blocks used for prediction according to the fifth embodiment.
Figure 20:
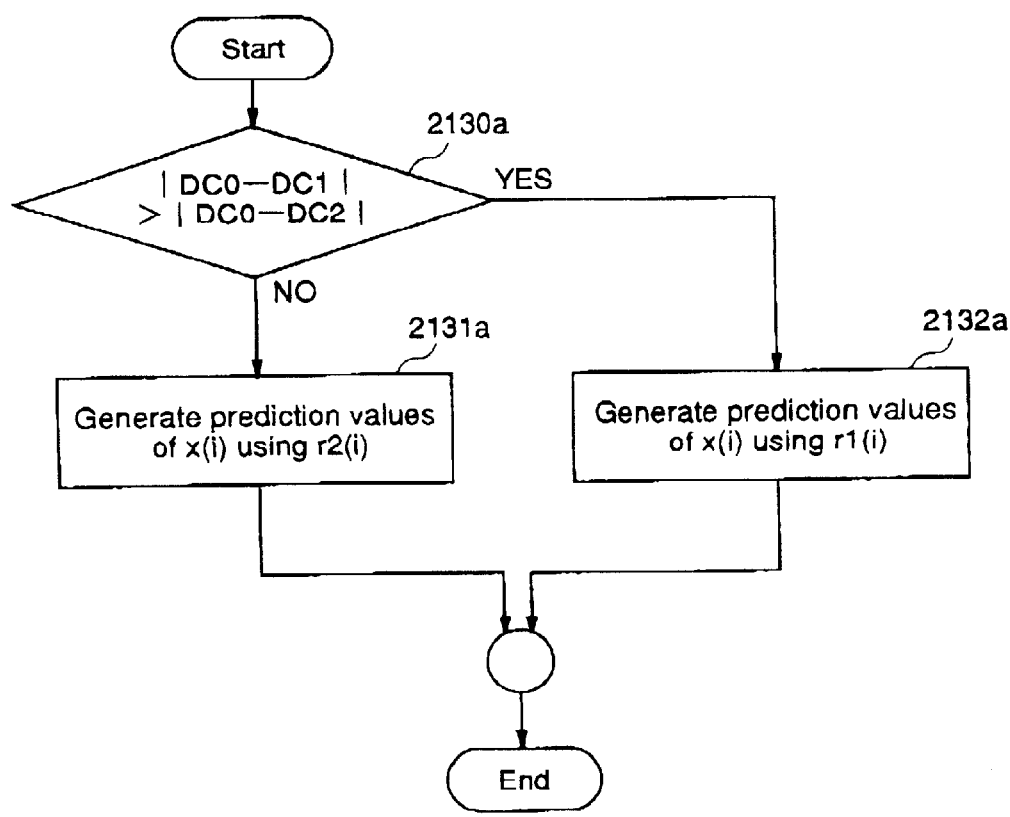
FIG. 20 is a flowchart showing a prediction value generating method according to the fifth embodiment.

In this fifth embodiment, as shown in FIG. 19, the DCT coefficient predictor 313 is used for generating the prediction values 111 of the DCT coefficient quantization values of a target block x (i) by referring to block r0 (i) positioned upper left, a block r1 (i) positioned above, and a block r2 (i) positioned left, with respect to and adjacently to the target block x as references blocks, irrespective of a DCT type of the target block.

The DCT unit 103, the quantizer 105, the adders 107 and 112, the VLC 109, and the block memory 115 are identical to those of the first embodiment.

Next, operation of the apparatus 3000 will be described.

When the digital image signal 110*a* is input to the image coding apparatus 3000, the block unit 100 blocks the signal 110*a* into image signals corresponding to the respective blocks frame by frame or field by field, and outputs the image signals 101 and the DCT type signal 102.

At this time, the blocking unit 100 rearranges scanning lines for each macroblock comprising 16×16 pixels for the field DCT, and outputs the image signals for each block comprising 8×8 pixels of the macroblock, when correlation of pixel values between fields is higher than that in a frame. As a result, in the macroblock in which scanning lines have been rearranged, a first field image formed by image signals on odd-numbered pixel rows is positioned at an upper side of the macroblock, i.e., areas (0) and (1), and a second field image formed by image signals on even-numbered pixel rows is positioned at a lower side of the macroblock, i.e., areas (2) and (3).

On the other hand, when the correlation between fields is lower than that in the frame, the blocking unit 100 does not rearrange scanning lines and outputs the input image signal 110*a* for each block.

Then, the DCT unit 103 transforms the image signals 101 into the frequency components (DCT coefficients) 104 by DCT. The quantizer 105 quantizes the DCT coefficients 104, and outputs the quantization values 106.

The quantization values 106 are input to the adder 107, which obtains the difference between the quantization values 106 and the prediction values 111, and outputs the DCT coefficient difference values 108, which are variable length coded by the VLC 109, and output as the bit stream (the coded image signal) 110*b*.

The difference values 108 are also input to the intra-frame prediction unit 310, which generates the prediction values of the quantization values 106 as follows.

The adder 112 adds the difference values 108 to the prediction values 111, and the resulting DCT coefficient quantization values 116 of the coded block is stored in the block memory 115. The predictor 313 generates the prediction values 111 of the DCT coefficient quantization values of the target block from the DCT quantization values 114 output from the block memory 115.

Subsequently, the intra-frame coefficient prediction method in the above coding process will be described in detail.

The intra-frame DCT coefficient prediction method of this embodiment differs from that of the first embodiment in that prediction values of the DCT coefficients of the target block are generated by referring to the coded block which has a prescribed positional relationship with the target block, irrespective of a DCT type of the target block.

Also in the fifth embodiment, as in the case of the first embodiment, assume that a DCT domain (frequency domain) is formed by frequency components in which an image signal forming the image space (spatial domain) has been processed by DCT and respective macroblocks are arranged in the DCT domain as in the case of the macroblocks in the spatial domain.

It is also assumed that, in the case of processing the macroblock by frame DCT, the image signal of each block is processed by DCT without rearranging scanning lines of the macroblock, and DCT coefficients of blocks positioned upper left, upper right, lower left, and lower right in the macroblock in the spatial domain are arranged in the areas (0), (1), (2), and (3) of the macroblock in the DCT domain, respectively, while in the case of processing the macroblock by field DCT, after rearrangement of scanning lines of the macroblock, the image signal of each block is processed by DCT, and DCT coefficients of respective blocks of the first field left, the first field right, the second field left, and the second field right are arranged in the areas (0), (1), (2) and (3).

The intra-frame DCT coefficient prediction method of the fifth embodiment will now be described in detail.

First, regardless of whether the target block has been processed by the frame DCT or the field DCT, a block positioned upper left, a block positioned above, a block positioned left, with respect to the target block x(i) are used as a reference block r0(i), a reference block r1(i), and a reference block r2(i), respectively.

Along flow in FIG. 21, as in the prior art DCT coefficient prediction method, in step S2130a, comparison is made between an absolute value |DC0–DC1| of difference of DCT components of DCT coefficients between the reference blocks r0(i) and r1(i) and an absolute value |DC0–DC2| of difference of DCT components of DCT coefficients between the reference blocks r0(i) and r2(i). When decided that |DC0–DC2| is smaller than |DC0–DC1|, in Step S2132a, DCT coefficients of the reference block r1(i) are used to generate prediction values of DCT coefficients of the target block x(i).

In other cases, in Step 2131a, DCT coefficients of the reference block r2(i) are used to generate prediction values of DCT coefficients of the target block x(i).

Thus, in prediction of DCT coefficients of a target block of the fifth embodiment, the coded block which has a prescribed positional relationship with the target block is used as the reference block, and comparison is made between correlation of DCT coefficients between adjacent reference blocks arranged in the vertical direction and correlation of DCT coefficients between adjacent reference blocks arranged in the horizontal direction in the vicinity of the target block, to decide which of these has higher correlation, a reference block with higher correlation with respect to the target block is selected, and from DCT coefficients of the selected reference block, prediction values of DCT coefficients of the target block are generated. Therefore, intra-frame prediction of the interlaced image signal or the specific progressive image is carried out in the DCT domain with efficiency and following simple procedure.

As a result, in coding process of the interlaced image signal and the specific progressive image in which macroblocks to-be-processed of difference DCT types coexist according to MPEG4, intra-frame information is used to improve efficiency in prediction of DCT coefficients of the target block, and thereby compressive coding of an image signal is realized while reducing spatially redundant image information.

Further, in a case where DCT coefficients of the reference block r2(i) in FIG. 19 are used as prediction values of DCT coefficients of the target block x(i), and DCT types of the reference block r2(i) and the target block x(i) differ from each other, only DCT component of the DCT coefficients of the reference block r2(i) may be used as prediction values of DCT coefficients of the target block x(i).

[Embodiment 6]

In an image processing apparatus (an image decoding apparatus) and an image processing method (an image decoding method) according to a sixth embodiment, a coded image signal is decoded by the use of the intra-frame DCT coefficient prediction method for use by the image coding apparatus and the image coding method of the fifth embodiment.

Figure 18:
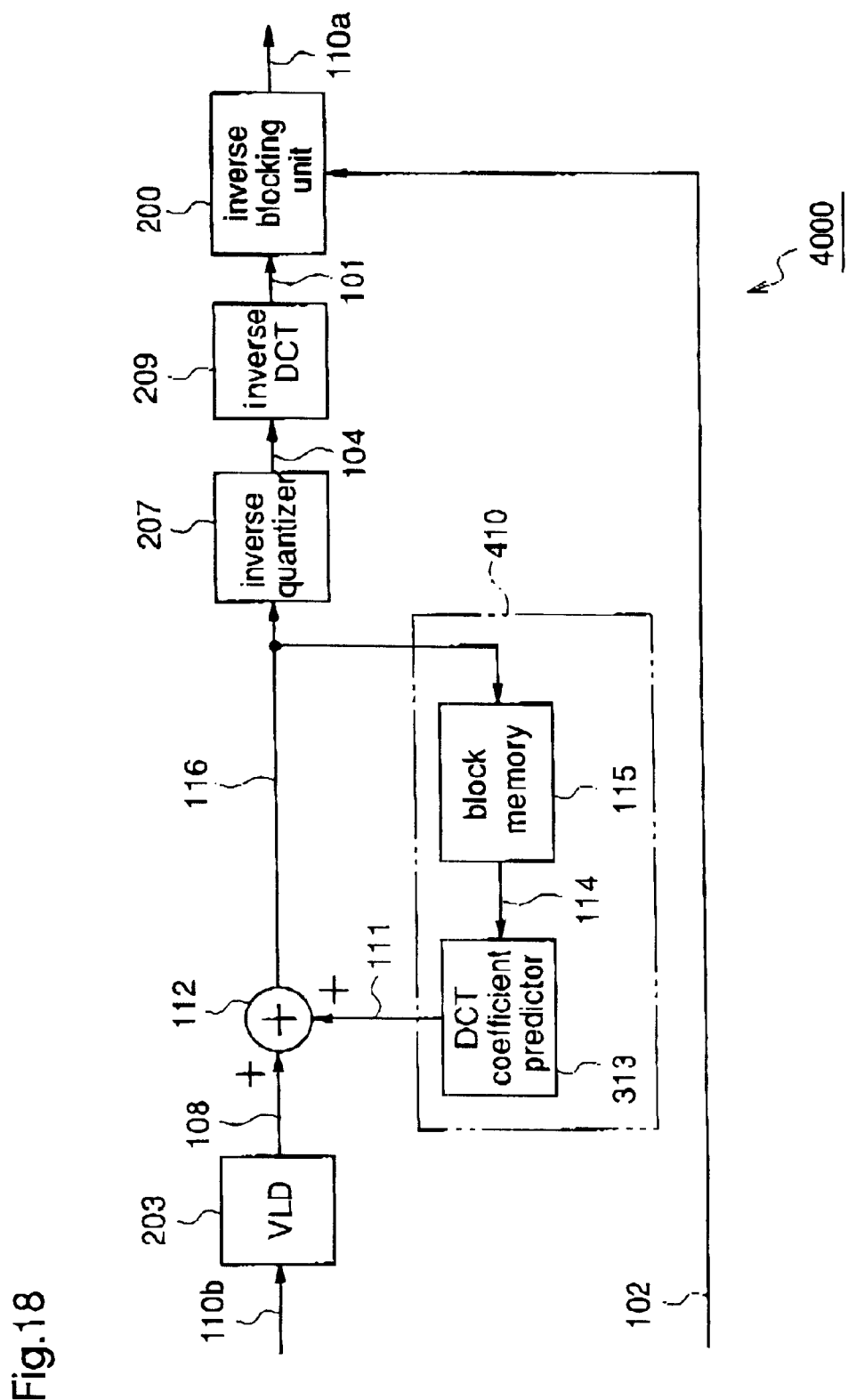
FIG. 18 is a block diagram showing an image decoding apparatus according to a sixth embodiment of the invention.

FIG. 18 is a block diagram showing an image decoding apparatus of the sixth embodiment, and in the figure, the same reference numerals as those in FIG. 7 designate the same or the corresponding parts. First, construction of the image decoding apparatus will be described.

Referring to FIG. 18, there is shown an image decoding apparatus 4000. The image decoding apparatus 4000 is used to receive the coded image signal (bit stream) 110b which has been coded by the image coding apparatus 3000 of the fifth embodiment, and decode the coded image signal 110b by the use of the intra-frame DCT coefficient prediction method.

To be specific, the image decoding apparatus 4000 includes a variable length decoder (VLD) 203 for receiving the bit stream 110b, performing variable length decoding to the bit stream 110b by data analysis to restore the DCT coefficient difference values 108 (difference values between the DCT coefficient quantization values 107 and the prediction values 111) of a target block to-be-decoded (target block), an intra-frame prediction unit 410 for generating intra-frame prediction values 111 of the target block, and an adder 112 for adding the prediction values 111 to the difference values 108 to restore DCT coefficient quantization values 116 of the target block.

The intra-frame prediction unit 410 includes a block memory 115 for storing the signals 116 output from the adder 112 as DCT coefficient quantization values of a decoded block (a block which has been already decoded), and a DCT coefficient predictor 313 for generating prediction values 111 of the DCT coefficient quantization values of the target block from the DCT coefficient quantization values 114 stored in the block memory 115.

The image decoding apparatus 4000 further includes an inverse quantizer 207 for inversely quantizing the signals 116 output from the adder 112 to restore DCT coefficients 104 of the target block, an inverse DCT unit 209 for performing inverse DCT to the DCT coefficients 104 output from the inverse quantizer 207 to restore an image signal 101 of the target block, and an inverse blocking unit 200 for receiving the signals 101 output from the inverse DCT unit 209 and restoring an image signal 110a of a scanning line structure on the basis of the DCT type signal 102 output from the image coding apparatus 4000.

The inverse blocking unit 200 functions as follows. The inverse blocking 200 combines image signals of blocks which belong to the same macroblock in an image space correspondingly to block positions in the macroblock, to generate an image signal of the macroblock, and with respect to the image signal of the macroblock in which horizontal pixel rows have been rearranged in its coding process so that the first field image formed by image signals on odd-numbered pixel rows is positioned at an upper side of the macroblock, and the second field image formed by image signals on even-numbered horizontal pixel rows is positioned at a lower side of the macroblock, it performs rearrangement for restoration to the horizontal pixel rows so as to form a frame image comprising the first and second fields, while with respect to the image signal of the macroblock in which horizontal pixel rows have not been rearranged, it generates an image signal forming an image comprising plural macroblocks without performing rearrangement for restoration to the horizontal pixel values.

Next, operation of the apparatus 4000 will be described.

When the coded image signal 110b is input to the image decoding apparatus-4000, the signal 110b is variable length decoded by data analysis by the VLD 203, and the DCT coefficient difference values 108 of the target block are output therefrom.

The difference values 108 are added to the prediction values 111 by the adder 112 to restore the DCT coefficient quantization values 116 of the target block.

At this time, the DCT coefficient quantization values 116 are input to the intra-frame prediction unit 410, where the values 116 are stored as the DCT coefficient quantization values of the decoded block in the block memory 115, and then the DCT coefficient quantization values 114 of the decoded block are read from the block memory 115 to the DCT coefficient predictor 313, in which prediction values of the DCT coefficient difference value 108 of a subsequent target block (a block to-be-processed subsequent to the target block) are generated by referring to the DCT coefficient quantization values 114 output from the block memory 115, as in the case of the intra-frame prediction unit 110 of the image coding apparatus 3000.

Further, the DCT coefficient quantization values 116 are input to the inverse quantizer 207, where they are converted into the DCT coefficients 104 of the target block by inverse quantization, and then the DCT coefficients 104 are transformed into the image signal 101 of the target block by inverse DCT by the inverse DCT unit 209.

The image signals 101 are input to the inverse blocking unit 200, which reproduces the image signal 110a of a scanning line structure on the basis of the DCT type signal 102 transmitted from the image coding apparatus 3000.

Thus, in the sixth embodiment, the coded image signal is decoded by the use of the intra-frame DCT coefficient prediction method. Therefore, it is possible to efficiently and correctly decode the coded image signal (bit stream) in which the image signal of the interlaced image signal or the specific progressive image has been intra-frame coded by the intra-frame DCT coefficient prediction, by simple intra-frame prediction in the DCT domain.

Further, a coding or decoding program which implements construction of image processing of the shape coding apparatus or shape decoding apparatus of each embodiment is recorded in a data recording medium such as a floppy disc, whereby the processing of each embodiment is carried out in an independent computer with ease. This is described below.

Figure 14:
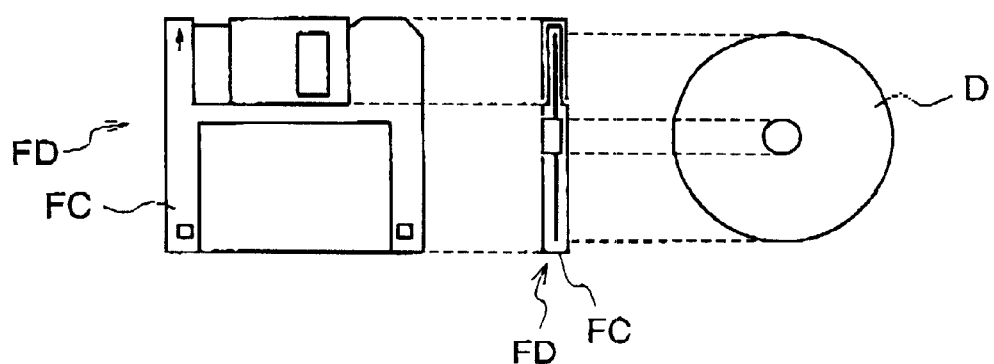
FIGS. 14(a) and 14(b) are diagrams for explaining a data storage medium containing a program for executing any of the intra-frame predictive coding/decoding processes according to the embodiments of the invention by a computer system.
FIG. 14(c) is a diagram showing the computer system.
Figure 14:
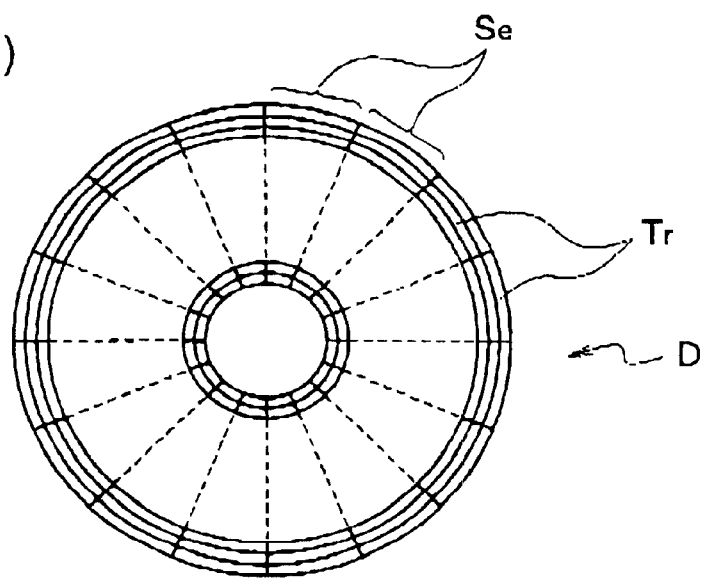
Figure 14:
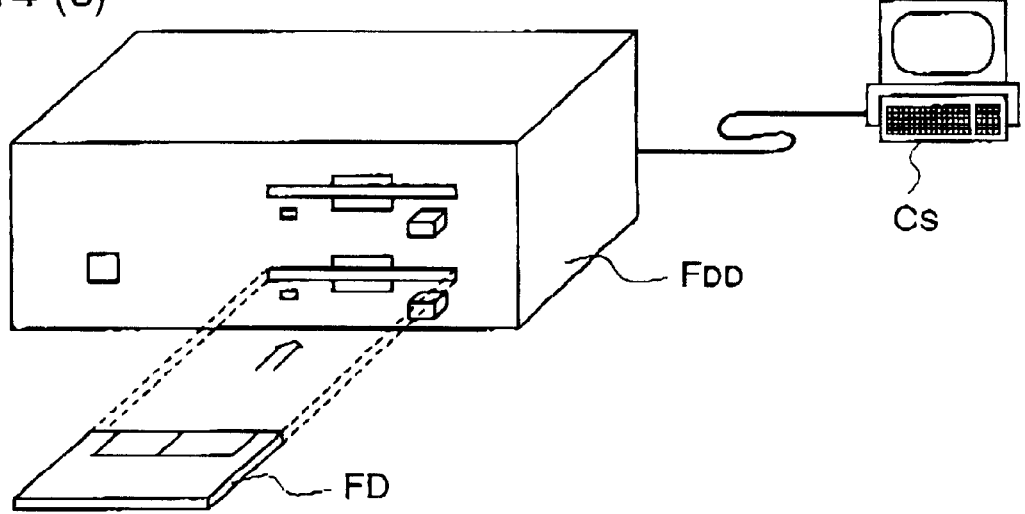

FIGS. 14(a)–14(c) are diagrams showing a case in which the coding or decoding in each of the first to sixth embodiments is carried out in a computer system using a floppy disc in which the coding or decoding program is stored.

FIG. 14(a) shows a front appearance and a cross-section of a floppy disc FD, and a floppy disc body D. FIG. 14(b) shows a physical format of the floppy disc body D.

Referring to FIGS. 14(a) and 14(b), the floppy disc body D is stored in a floppy disc case F and in a surface thereof, plural tracks Trs are formed concentrically from outer to inner radius thereof, each track being divided into 16 sectors Se in an angle direction. Data of the program is recorded in allocated regions on the floppy disc body D.

FIG. 14(c) is a diagram showing a construction with which the program is recorded/regenerated in/from the floppy disc FD. In case of recording the program in the floppy disc FD, data of the program is written thereto through a floppy disc drive FDD from a computer system Cs. In another case of constructing the coding or decoding apparatus in the computer system Cs using the program recorded in the floppy disc FD, the program is read from the floppy disc FD by means of the floppy disc drive FDD and transferred to the computer system Cs.

Although the floppy disc is used as the data recording medium herein, an optical disc may be used. In addition, the data recording medium is not limited to these, and an IC card, an ROM cassette, or the like may be used to implement the coding or decoding so long as it can record a program.

What is claimed is:

1. An image processing method in which an image signal forming an image space comprising plural pixels arranged in matrix in horizontal and vertical directions is divided into image signals corresponding to plural macroblocks of a rectangular shape into which the image space is divided, and image signals of subblocks of each macroblock are coded for each subblock, said method comprising the steps:

rearranging horizontal pixel rows of an image signal of a macroblock so that a first field image formed by image signals on odd-numbered horizontal pixel rows is positioned at an upper side of the macroblock and a second field image formed by image signals on even-numbered horizontal pixel rows is positioned at a lower side of the macroblock;

transforming one of the image signal of the macroblock in which rearrangement has been performed and an image signal of a macroblock in which rearrangement has not been performed, into frequency components by frequency transformation, for each of four subblocks positioned upper left, upper right, lower left, and lower right in the macroblock;

generating prediction values of frequency components of a target subblock to be coded by referring to at least one of a coded subblock positioned above and adjacently to the target subblock, a coded subblock positioned at the left of and adjacently to the target subblock, a coded subblock positioned at the upper left of and adjacently to the target subblock, wherein when the prediction values of the frequency components of the target subblock are generated, it is decided that one of the coded subblock positioned above and adjacently to the target subblock and the coded subblock positioned at the left of and adjacently to the target subblock is referred to, based on direct current components of frequency components of the coded subblocks which are positioned above and adjacently to the target subblock, at the left of and adjacently to the target subblock, and at the upper left of and adjacently to the target subblock, respectively; and coding difference values between the frequency components and the prediction values of the target subblock, wherein when an absolute value of difference of direct current components of frequency components between the coded subblock positioned above and the coded subblock positioned at the upper left is smaller than an absolute value of difference of direct current components of frequency components between the coded subblock positioned at the left and the coded subblock positioned at the upper left, the prediction values of the frequency components of the target subblock are generated by referring to frequency components of the coded subblock positioned at the left of the target subblock, and when an absolute value of difference of direct current components of frequency components between the coded subblock positioned at the left and the coded subblock positioned at the upper left is smaller than an absolute value of difference of direct current components of frequency components between the coded subblock positioned above and the coded subblock positioned at the upper left, the prediction values of the frequency components of the target subblock are generated by referring to frequency components of the coded subblock positioned above of the target subblock.

2. An image processing method in which an image signal forming an image space comprising plural pixels arranged in matrix in horizontal and vertical directions is divided into image signals corresponding to plural macroblocks of a rectangular shape into which the image space is divided, and image signals of subblocks of each macroblock are coded for each subblock, said method comprising the steps of:

rearranging horizontal pixel rows of an image signal of a macroblock so that a first field image formed by image signals on odd-numbered horizontal pixel rows is positioned at an upper side of the macroblock and a second field image formed by image signals on even-numbered horizontal pixel rows is positioned at a lower side of the macroblock;

transforming one of the image signal of the macroblock in which rearrangement has been performed and an image signal of a macroblock in which rearrangement has not been performed, into frequency components by frequency transformation, for each of four subblocks positioned upper left, upper right, lower left, and lower right in the macroblock;

generating prediction values of frequency components of a target subblock to be coded by referring to at least one of subblocks which have been already coded and are positioned in the vicinity of and above the target subblock, in the vicinity of and at the left of the target subblock, and in the vicinity of and at the upper left of the target subblock, respectively, in the image space, wherein employed as prediction values of frequency components of the target subblock is one of a first weighted average of frequency component obtained among first group of plural coded subblocks which are positioned above the target subblock and aligned in the vertical direction, and a second weighted average of frequency component obtained among a second group of plural coded subblocks which are positioned at the left of the target subblock and aligned in the vertical direction; and coding difference values between the frequency components and the prediction values of the target subblock when an absolute value of difference of direct current components of frequency components between the decoded subblock positioned above and the decoded subblock positioned at the upper left is smaller than an absolute value of difference of direct current components of frequency components between the decoded subblock positioned at the left and the decoded subblock positioned at the upper left, the prediction values of the frequency components of the target subblock are generated by referring to frequency components of the decoded subblock positioned at the left of the target subblock, and when an absolute value is difference of direct current components of frequency components between the decoded subblock positioned at the left and the decoded subblock positioned at the upper left is smaller than an absolute value of difference of direct current components of frequency components between the decoded subblock positioned above and the decoded subblock positioned at the upper left, the prediction values of the frequency components of the target subblock are generated by referring to frequency components of the decoded subblock positioned above.

3. An image processing method as defined in claim 1, wherein:

the first weighted average is obtained by performing the weighted averaging of frequency component with a weighting ratio of 1 for a specific coded subblock among the first-group coded subblocks; and the second weighted average is obtained by performing the weighted averaging of frequency component with a weighting ratio of 1 for a specific coded subblock among the second-group coded subblocks.

4. An image processing method as defined in claim 3 wherein:

the specific coded block among the first-group coded subblocks is one positioned nearest to the target block among the first-group coded subblocks; and the specific coded block among the second-group coded subblocks is one positioned nearest to the target block among the second-group subblocks.

5. An image processing method for decoding a coded image signal for each subblock in which coding including rearrangement of horizontal pixel rows and frequency transformation has been performed to an image signal forming an image space comprising plural pixels arranged in matrix in the horizontal and vertical directions for each of subblocks of respective macroblocks of a rectangular shape into which the image space is divided, and method comprising the steps of:

generating prediction values of frequency components of a target subblock to be decoded by referring to at least one of a decoded subblock positioned above and adjacently to the target subblock, a decoded subblock positioned at the left of and adjacently to the target subblock, a decoded subblock positioned at the upper left of and adjacently to the target subblock, wherein when the prediction values of the frequency components of the target subblock are generated, it is decided that one of the decoded subblock positioned above and adjacently to the target subblock and the decoded subblock positioned at the left of and adjacently to the target subblock is refereed to, based on direct current components of frequency components of the decoded subblocks which are positioned above and adjacently to the target subblock, at the left of and adjacently to the target subblock, and at the upper left of and adjacently to the target subblock, respectively;

adding signals obtained by data analysis of the coded image signal of the target subblock to the prediction values to generate frequency components of the target subblock;

transforming the generated frequency components of the subblock into an image signal by inverse frequency transformation;

combining image signals of subblocks which belong to the same macroblock in the image space correspondingly to subblock positions in the macroblock, to generate an image signal of the macroblock; and with respect to an image signal of a macroblock in which horizontal pixel rows have been rearranged when it has been coded so that a first field image formed by image signals on odd-numbered horizontal pixel rows is positioned at an upper side of the macroblock, and a second field image formed by image signals on even-numbered horizontal pixel rows is positioned at a lower side of the macroblock, performing rearrangement for restoration to the horizontal pixel rows so as to form a frame image comprising the first and second fields, and with respect to an image signal of a macroblock in which the horizontal pixel rows have not been rearranged, regenerating an image signal forming an image space comprising plural macroblocks without performing rearrangement for restoration to the horizontal pixel rows.

6. An image processing method for decoding a coded image signal for each subblock in which coding including rearrangement of horizontal pixel rows and frequency transformation has been performed to an image signal forming an image space comprising plural pixels arranged in matrix in the horizontal and vertical directions for each of subblocks of respective macroblocks of a rectangular shape into which the image space is divided, said method comprising the steps of:

generating prediction values of frequency components of a target subblock to be decoded by referring to at least one of subblocks which have been already decoded and are positioned in the vicinity of and above the target subblock, in the vicinity of and at the left of the target subblock, and in the vicinity of and at the upper left of the target subblock, respectively in the image space, wherein employed as prediction values of frequency components of the target subblocks is one of a first weighted average of frequency component obtained among a first group of plural decoded subblocks which are positioned above the target subblock and aligned in the vertical direction, and a second weighted average of frequency component obtained among a second group of plural decoded subblocks which are positioned at the left of the target subblock and aligned in the vertical direction;

adding signals obtained by data analysis of the coded image signal of the target subblock to the prediction values to generate frequency components of the target subblock;

transforming the generated frequency components of the subblock into an image signal by inverse frequency transformation;

combining image signals of subblocks which belong to the same macroblock in the image space correspondingly to subblock positions in the macroblock, to generate an image signal of the macroblock; and with respect to an image signal of a macroblock in which horizontal pixel rows have been rearranged when it has been coded so that a first field image formed by image signals on odd-numbered horizontal pixel rows is positioned at an upper side of the macroblock, and a second field image formed by image signals on even-numbered horizontal pixel rows is positioned at a lower side of the macroblock, performing rearrangement for restoration to the horizontal pixel rows so as to form a frame image comprising the first and second fields, and with respect to an image signal of a macroblock in which the horizontal pixel rows have not been rearranged, regenerating an image signal forming an image space comprising plural macroblocks without performing rearrangement for restoration to the horizontal pixel rows.

7. An image processing method as defined in claim 6, wherein:

the first weighted average is obtained by performing the weighted averaging of frequency component with a weighting ration of 1 for a specific decoded subblock among the first-group decoded subblocks; and the second weighted average is obtained by performing the weighted averaging of frequency component with a weighting ratio of 1 for a specific decoded subblock among the second-group decoded subblocks.

8. An image processing method as defined in claim 7 wherein:

the specific decoded block among the first-group decoded subblocks is one positioned nearest to the target block among the first-group decoded subblocks; and the specific decoded block among the second-group decoded subblocks is one positioned nearest to the target block among the second-group decoded subblocks.

* * * * *

UNITED STATES PATENT AND TRADEMARK OFFICE
CERTIFICATE OF CORRECTION

Page 1 of 1

PATENT NO. : 6,275,533 B1
DATED : August 14, 2001
INVENTOR(S) : Takahiro Nishi

It is certified that error appears in the above-identified patent and that said Letters Patent is hereby corrected as shown below:

Column 34,
Line 18, "is" should read -- of --.
Line 55, "and" should read -- said --.

Column 35,
Line 52, "subblocks" should read -- subblock --.

Signed and Sealed this

Twenty-first Day of May, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,275,533 B1
DATED : August 14, 2001
INVENTOR(S) : Takahiro Nishi

It is certified that error appears in the above-identified patent and that said Letters Patent is hereby corrected as shown below:

Column 35,
Line 33, after "rows" add -- , wherein when an absolute value of difference of direct current components of frequency components between the decoded subblock positioned above and the decoded subblock positioned at the upper left is smaller than an absolute value of difference of direct current components of frequency components between the decoded subblock positioned at the left and the decoded subblock positioned at the upper left, the prediction values of the frequency components of the target subblock are generated by referring to frequency components of decoded subblock positioned at the left of the target subblock, and when an absolute value is difference of direct current components of frequency components between the decoded subblock positioned at the left and the decoded subblock positioned at the upper left is smaller than an absolute value of difference of direct current components of frequency components between the decoded subblock positioned above and the decoded subblock positioned at the upper left, the prediction values of the frequency components of the target subblock are gnerated by referring to frequency components of the decoded subblock positioned above --.

Column 34,
Line 5, add -- . -- after "subblock"; delete text of lines 6-28.
Line 29, change "1" to -- 2 --.

Column 35,
Line 2, change "refereed" to -- referred --.

Signed and Sealed this

Twenty-first Day of September, 2004

JON W. DUDAS
*Director of the United States Patent and Trademark Office*